US 9,377,914 B2

(12) United States Patent
Fix et al.

(10) Patent No.: US 9,377,914 B2
(45) Date of Patent: Jun. 28, 2016

(54) CAPACITIVELY OPERATING TOUCH PANEL DEVICE

(75) Inventors: Walter Fix, Furth (DE); Andreas Ullmann, Zirndorf (DE)

(73) Assignee: PolyIc GmbH & Co. KG, Furth (DE)

( * ) Notice: Subject to any disclaimer, the term of this patent is extended or adjusted under 35 U.S.C. 154(b) by 354 days.

(21) Appl. No.: 14/233,250

(22) PCT Filed: Jun. 21, 2012

(86) PCT No.: PCT/EP2012/061930
§ 371 (c)(1),
(2), (4) Date: Mar. 21, 2014

(87) PCT Pub. No.: WO2013/013904
PCT Pub. Date: Jan. 31, 2013

(65) Prior Publication Data
US 2014/0202840 A1  Jul. 24, 2014

(30) Foreign Application Priority Data

Jul. 22, 2011 (DE) .......................... 10 2011 108 153

(51) Int. Cl.
G06F 3/041  (2006.01)
G06F 3/044  (2006.01)

(52) U.S. Cl.
CPC ...................................... G06F 3/044 (2013.01)

(58) Field of Classification Search
None
See application file for complete search history.

(56) References Cited

U.S. PATENT DOCUMENTS 4,304,976 A   12/1981   Gottbreth et al.
4,659,874 A   4/1987   Landmeier
(Continued)

FOREIGN PATENT DOCUMENTS

CN   101794187 A   8/2010
DE   2910451 A1   9/1979
(Continued)

OTHER PUBLICATIONS

EPO decision to grant, Feb. 2, 2015.
(Continued)

*Primary Examiner* — Adam R Giesy
(74) *Attorney, Agent, or Firm* — William Squire; Carella Byrne et al.

(57) ABSTRACT

A multi-layer body has a transparent first area which comprises a plurality of touch panels in the first area with a carrier substrate transparent in the first area, and a partially electrically conductive first layer transparent at least in the first area. The first layer has, in the first area, electrically conductive transmission areas, receiving areas and connection areas each formed by a pattern of electrically conductive, non-transparent tracks whose width in the first area is such that the electrically conductive transmission areas, receiving areas and connection areas are transparent. One of the electrically conductive transmission areas and one of the electrically conductive receiving areas are in each touch panel in the first layer and galvanically separated from each other on both sides of a gap separating them, wherein n transmission areas of different touch panels in the first layer are electrically connected to each other and to a contact area outside the first area in the first layer via one of the electrically conductive connection areas of the first layer, and m receiving areas of different touch panels in the first layer are electrically connected to each other and to a contact area formed outside the first area in the first layer via one of the electrically conductive connection areas formed in the first layer, wherein n≥ and m≥2.

26 Claims, 20 Drawing Sheets

(56) References Cited

U.S. PATENT DOCUMENTS

| | | | |
|---|---|---|---|
| 4,879,508 A | 11/1989 | Andermo | |
| 5,034,740 A | 7/1991 | Acher | |
| 6,222,522 B1 | 4/2001 | Mathews et al. | |
| 9,018,536 B2 | 4/2015 | Ullmann et al. | |
| 2006/0097991 A1 | 5/2006 | Hotelling et al. | |
| 2009/0073135 A1 | 3/2009 | Lin et al. | |
| 2011/0022351 A1 | 1/2011 | Philipp et al. | |
| 2012/0193130 A1 | 8/2012 | Fix et al. | |
| 2012/0273336 A1 | 11/2012 | Kuriki | |
| 2014/0055383 A1* | 2/2014 | Kim | G06F 3/041 345/173 |
| 2014/0060909 A1* | 3/2014 | Ullmann | B32B 38/0012 174/258 |
| 2014/0166464 A1 | 6/2014 | Fix et al. | |
| 2014/0168109 A1* | 6/2014 | Kang | G06F 3/044 345/173 |
| 2014/0238728 A1 | 8/2014 | Fix et al. | |

FOREIGN PATENT DOCUMENTS

| | | |
|---|---|---|
| DE | 30 04461 A1 | 8/1981 |
| DE | 3149722 A1 | 9/1982 |
| DE | G8812393.6 U1 | 12/1988 |
| DE | 102005041114 A1 | 3/2007 |
| DE | 202006014244 U1 | 3/2007 |
| DE | 20 2006 018448 | 4/2007 |
| DE | 202007007345 | 12/2007 |
| DE | 20 2009 017952 U1 | 10/2010 |
| DE | 102009014757 A1 | 10/2010 |
| DE | 102009044110 A1 | 4/2011 |
| DE | 102009058138 A1 | 6/2011 |
| EP | 2045698 A2 | 4/2009 |
| EP | 2045698 A2 | 4/2009 |
| EP | 2065794 A1 | 6/2009 |
| GB | 2090979 A | 7/1982 |
| GB | 2439614 B | 12/2008 |
| GB | 2469386 B | 10/2010 |
| JP | H02-001263 | 1/1990 |
| JP | H10-312715 | 11/1998 |
| RU | 2029353 | 2/1995 |
| RU | 61899(U1) | 3/2007 |
| WO | 2010046650 A2 | 4/2010 |

OTHER PUBLICATIONS

International Search report and opinion citing DE102009044110 and WO 2010/046650 Apr. 5, 2012.
Examination report in corresponding German application.

* cited by examiner

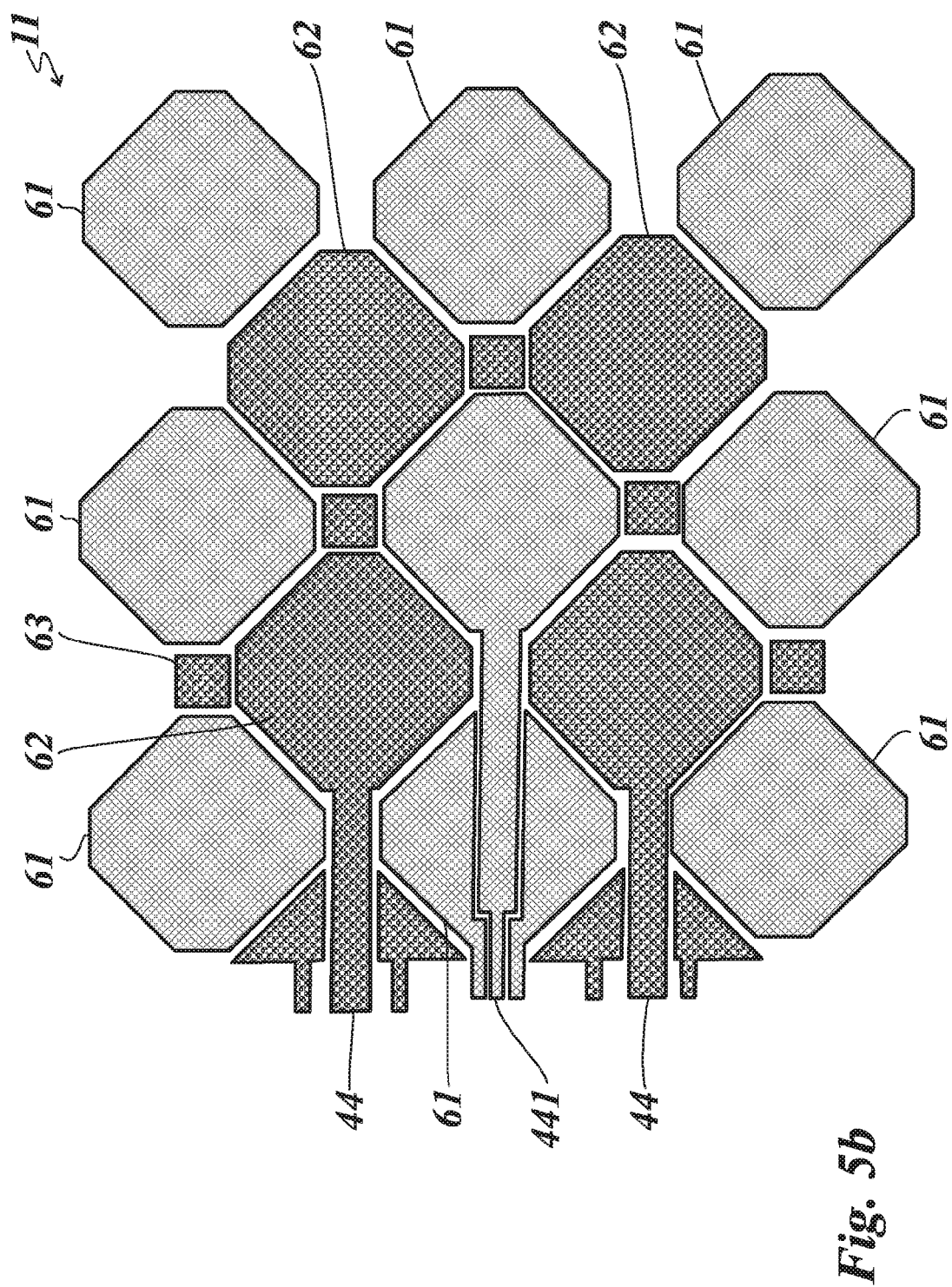

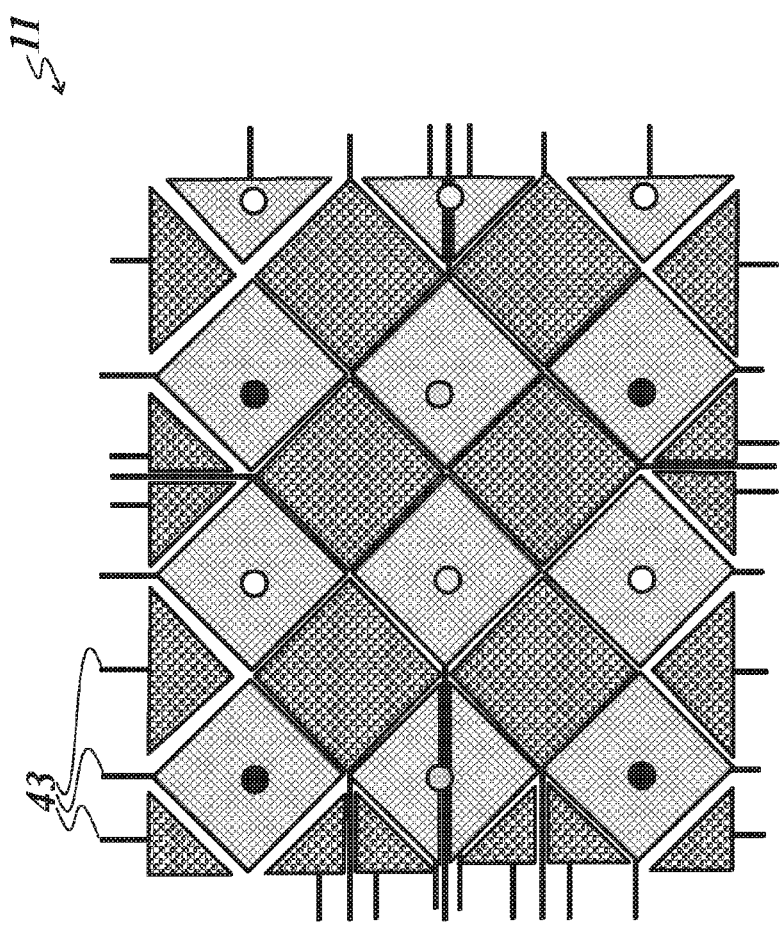
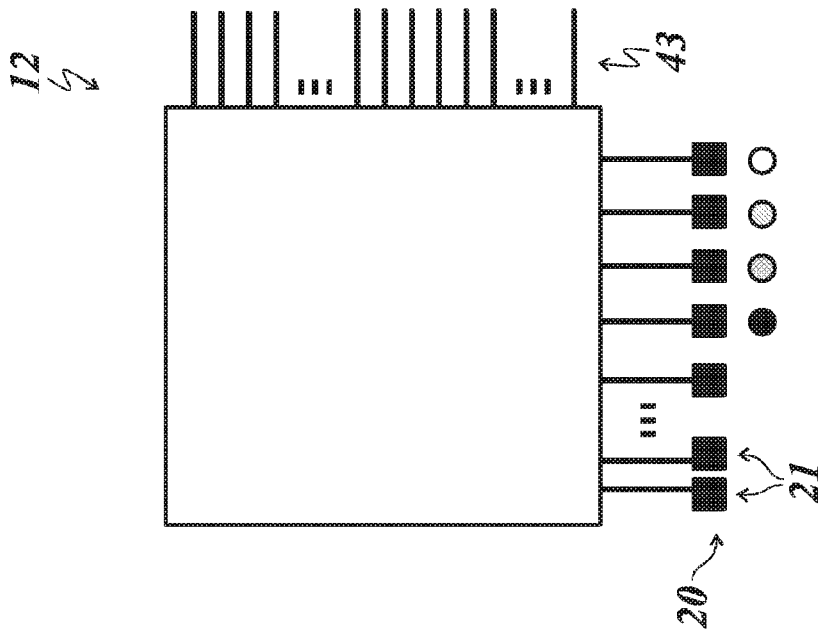
Fig. 6a

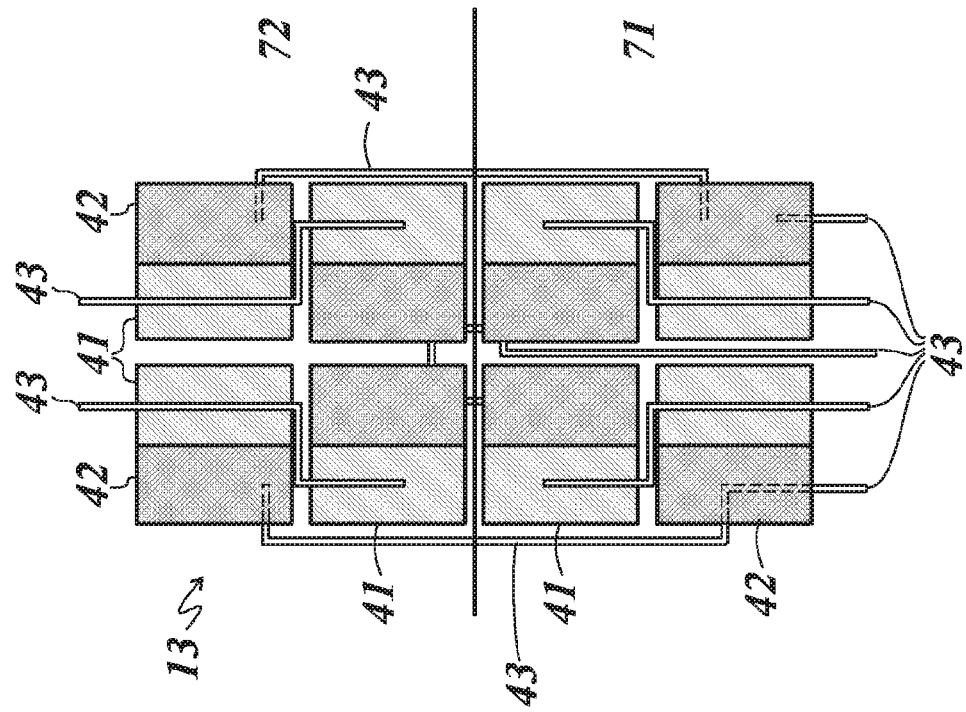
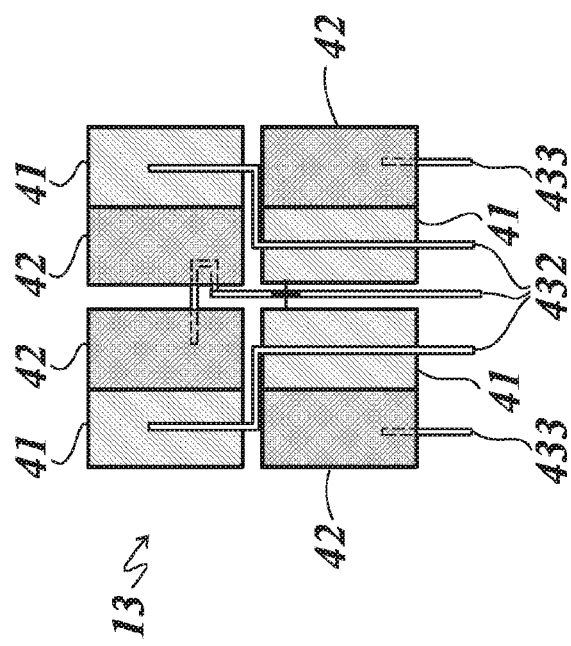
Fig. 7b
Fig. 7a

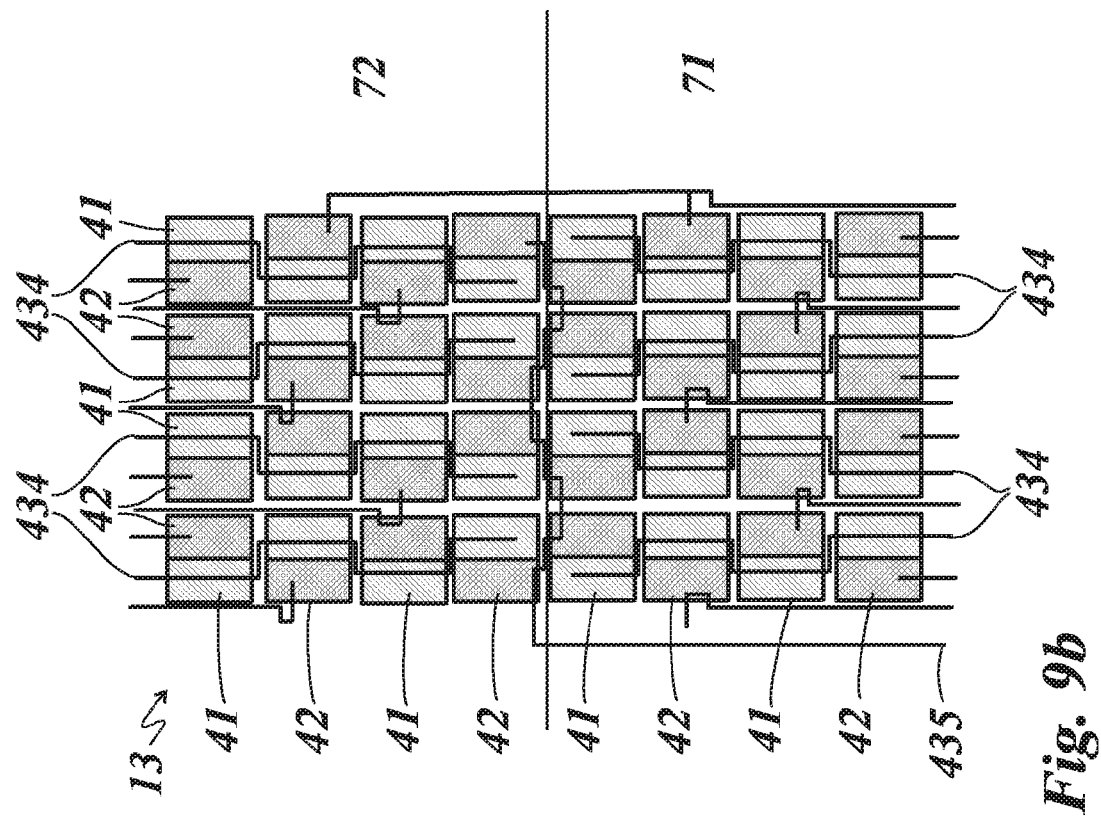
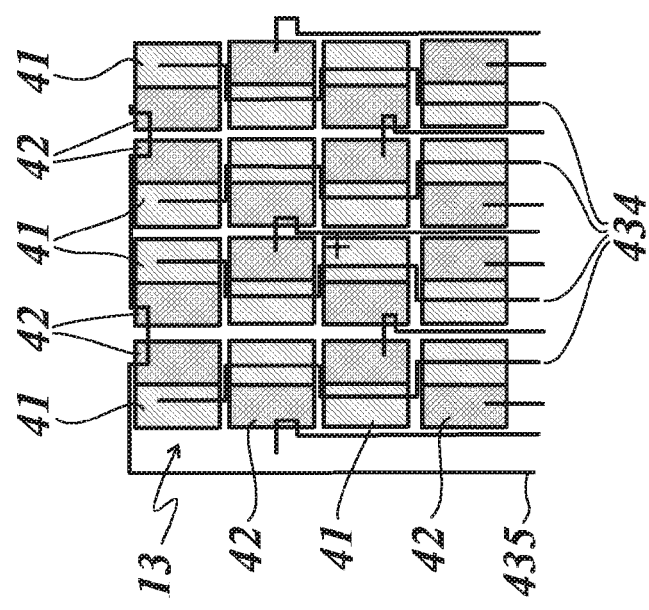

CAPACITIVELY OPERATING TOUCH PANEL DEVICE

The invention relates to a multi-layer body with a transparent first area in which a plurality of touch panels are arranged.

Until now, a multi-layer construction having at least two strip conductor planes separated by an insulator has been necessary for producing sensor-controlled touchscreens. The two strip conductor planes are formed here from a transparent conductive material such as ITO.

The object of the invention is now to provide an improved construction of a multi-layer body with a plurality of touch panels arranged in a transparent area of the multi-layer body.

This object is achieved by a multi-layer body with a first area which is transparent for the human eye and with a plurality of touch panels arranged in the first area, which have a carrier substrate which is transparent at least in the first area and a partial electrically conductive first layer which is transparent for the human eye at least in the first area, and which, in the first area, has electrically conductive transmission areas, receiving areas and connection areas, which are each formed by a pattern of electrically conductive, non-transparent tracks, the width of which in the first area is chosen such that the electrically conductive transmission areas, receiving areas and connection areas are transparent for the human eye in the first area, wherein, in the area of each touch panel in the first layer, one of the electrically conductive transmission areas and one of the electrically conductive receiving areas are formed, which areas are arranged galvanically separated from each other on either side of a gap which separates them, wherein n transmission areas of different touch panels in the first layer are electrically connected to each other and to a contact area formed outside the first area in the first layer via one of the electrically conductive connection areas formed in the first layer, and m receiving areas of different touch panels in the first layer are electrically connected to each other and to a contact area formed outside the first area in the first layer via one of the electrically conductive connection areas formed in the first layer, wherein n≥2 and m≥2.

The invention achieves the advantage that, by realizing the touch panels and the wiring thereof in a single layer in the transparent area as well as by the special design and structuring of the first electrically conductive layer, touch panels with high transparency can be produced cost-effectively.

Advantageous embodiments of the invention are identified in the dependent claims.

According to an advantageous embodiment, n and/or m is chosen ≥3 and in particular ≥4. Furthermore, it is advantageous if the n transmission areas and/or m receiving areas of the respective connection area are connected to each other within the first area.

It is also advantageous here if between 30 and 70% of the receiving areas and/or the transmission areas different touch panels are connected to n or m other transmission areas or receiving areas via a connection area.

According to a preferred embodiment, the touch panels are arranged according to a 2-dimensional matrix with two or more columns and two or more rows, in particular arranged with four or more columns and four or more rows. It has proved advantageous here that the matrix has between four and ten rows and four or more columns, in particular 16 or more columns. It has been shown that complying with these design rules results in a particularly cost-effective production in comparison with a two-layer construction.

Here, the touch panels can be successive to each other in a constant grid width in the rows and columns of the matrix. However, it is also possible that the grid width varies, and that the columns and rows of the matrix are each defined not by a line, but by a transformed coordinates system, and thus are formed, for example, in the shape of a waved line or in the shape of an arc.

According to a preferred embodiment example of the invention, in the case of touch panels a first group of touch panels of the transmission areas is arranged in each case to the left of the receiving area and in the case of touch panels of a second group of touch panels of the transmission areas arranged in each case to the right of the receiving area. Touch panels of the first group and touch panels of the second group are now arranged alternately next to each other in each of the rows of the matrix, with the result that two transmission areas or two receiving areas are opposite each other in each case at the boundaries between two touch panels of the same row. Such a varying arrangement of transmission areas and receiving areas of the touch panels will considerably increase the number of transmission areas and receiving areas which can be electrically connected to each other with a connection area without impairing the function of the touch panels or the transparency of the first area.

It is to be taken into account here that it is assumed for the use of the design rules set out above that the gap separating the receiving area from the transmission area is oriented more in the direction of the columns of the matrix than in the direction of the rows of the matrix. To determine what sequence direction a column or a row of the matrix now forms, the above design rules are thus to be based on the above definition. Right and left corresponds here to the direction to the following or preceding column.

On the basis of this basic design rule, the following advantageous embodiment variants arise in particular.

It has proved to be particularly advantageous that touch panels of the same group of touch panels are arranged further in every column in each case. Areas in which at least four transmission areas or four receiving areas are arranged adjacent to each other thus arise within the matrix.

It is advantageous here to combine four transmission areas arranged adjacent to each other in such a way into one transmission group and to connect them to each other and to an assigned contact area via one of the connection areas and/or to combine four such receiving areas arranged adjacent to each other into one receiving group and to connect them to each other and to the assigned contact area via one of the connection areas. The proportion of connection areas on the whole surface of the first area is hereby further reduced, and the transparency of the first area as well as the functionality of the touch areas is thus further improved.

In a matrix of for example 4×4 touch panels, four transmission groups or receiving groups for example can thus be formed. With a correspondingly larger number of touch panels in the matrix, a correspondingly larger number of receiving groups and transmission groups results. The receiving and transmission groups here are preferably arranged offset from each other in a checkered pattern. For example, in the column direction, in each case one or more transmission groups or receiving groups are thus successive to each other, while in the row direction transmission groups and receiving groups alternate. In sequence, the transmission groups and receiving groups in the column direction are each offset from each other here by half a cycle in each case. A cycle is understood here to mean the spacing of the centroid of two transmission groups or receiving groups which are successive in the column direction.

It is particularly advantageous here if, relative to each other, four receiving groups are arranged adjacent to at least one transmission group or four transmission groups are arranged adjacent to at least one receiving group.

Furthermore, it is advantageous if the connection areas, which connect the transmission groups and receiving groups to the assigned contact areas, have strip conductor sections which run from inside to outside in the first area and which run in the boundary area between two columns or two rows of the matrix. It is particularly advantageous here if such strip conductor sections run towards all sides from inside to outside, i.e. such strip conductor sections run upwards, downwards, to the left and to the right and such strip conductor sections thus run in a stellate manner towards all sides from inside to outside. This achieves the advantage that the connection areas leave the first area distributed evenly over the whole edge area of the first area to contact the contact areas, and the proportion of the surface of the first area covered by the connection areas can thus be kept particularly low.

Furthermore, it is possible that two or more transmission or receiving areas arranged adjacent to each other are connected to form an area which is electrically conductive over the whole surface and which has in particular a rectangular, square or octagonal shape. It is thus possible, for example, that the transmission areas or receiving areas assigned, respectively, to a transmission group or receiving group are connected by a connection area to form an area which is electrically conductive over the whole surface and which has in particular the above-described form.

Furthermore, it has proved advantageous if the rows of the matrix and the longitudinal axis of the first area have an angular offset to each other, in particular form an angle of approximately 45°. Particular advantages arise here precisely when, as mentioned above, two or more transmission or receiving areas arranged adjacent to each other are connected to form an area which is electrically conductive over the whole surface and in particular form a transmission group or a receiving group.

Advantageously, the first area here has a rectangular or a square shape.

Furthermore, it is advantageous if in each case two or more transmission or receiving areas arranged adjacent to each other are assigned to a transmission group or a receiving group and one or more of the connection areas have strip conductor sections which run from inside to outside in relation to the first area and which each divide one or more of these transmission or receiving groups. It is thus possible, for example, that four adjacent transmission areas or receiving areas are combined in each case into a transmission or receiving group, respectively, and this receiving group are then divided by such a connection area. This makes it possible to minimize the path length of connection areas and thus the resulting electrical resistance, despite the combining of the receiving areas and the transmission areas into similarly formed transmission groups and receiving groups.

Further advantages arise from the fact that the strip conductor sections have a widening in the area in which they divide a transmission or receiving group, or when receiving groups or transmission groups are geometrically shortened in the corners and are thus, for example, formed octagonal. This also allows the shape and, above all, the length of connection areas to be optimized and thus the electrical resistance to be reduced without limiting the transparency.

Furthermore, a point-symmetrical or mirror-symmetrical arrangement of the transmission areas and the receiving areas of the matrix has proved worthwhile in particular.

According to a further preferred embodiment variant, touch panels of the first group and second group are arranged alternately next to each other in a first subarea of the matrix, both in the rows and in the columns, with the result that two transmission areas and two receiving areas are alternately opposite each other at the boundary between two touch panels of the same row, wherein the matrix has two or more rows and two or more columns in the first subarea. In this embodiment variant, the sequence of the formation of the touch panels thus varies both in the column direction and in the row direction. This also allows the necessary proportion of the surface covered by the connection areas to be significantly reduced, which achieves the above-described advantages.

In such an arrangement of transmission areas and receiving areas, it is particularly advantageous to connect in each case either all of the receiving areas of every column or every column or all transmission areas of a column or every column to each other in an electrically conductive manner via a respective connection area. The connection area here advantageously has a meandering shape, as transmission areas or receiving areas which are in each case transverse to each other must be electrically connected to each other in the column direction by the connection area.

Furthermore, it is advantageous here to connect all transmission areas of the uppermost row or all receiving areas of the upper row to each other electrically via a respective connection area.

Furthermore, it is advantageous if one or more of the connection areas of the first subareas have strip conductor sections which run in the direction of the columns of the matrix from inside to outside in relation to the first area and which are in particular arranged in the boundary area between two columns of the matrix. It is thus advantageous if the number of strip conductor sections of the connection areas which run in the column direction is more than twice as large as that of the strip conductor sections of the connection areas which run in the row direction.

A particular advantage of the above-described arrangement of transmission and receiving areas here is that any number of such first subareas can be arranged next to each other in the row direction and another corresponding second subarea built into its arrangement of the transmission areas and receiving areas can also be arranged in the column direction above the first subarea. It is thus possible to realize an arrangement with a large number of touch panels by means of this procedure.

A second subarea of this type, which is preferably arranged above the second subarea, thus has a sequence of touch panels of the first group and of the second group that alternates both in the direction of the columns and in the direction of the rows. It is particularly advantageous here if the second subarea has a mirror-symmetrical arrangements, with respect to the boundary between the first and second subareas, of transmission areas and receiving areas and/or connection areas in relation to the first subarea. The proportion of connection areas on the first area can hereby be reduced further.

Furthermore, the matrix advantageously has at least one third subarea, which has the same arrangement of transmission areas and receiving areas and/or connection areas as the first subarea or the second subarea. The third subareas are arranged next to the first subareas in the row direction or next to the second subarea in the row direction.

According to a further preferred embodiment example of the invention, in a second area which surrounds the first areas, an electrically conductive second layer are provided, via which two or more connection areas of the first layer are electrically coupled to each other. Here, several groups of connection areas of the first layer are preferably coupled together in each case, whereby the number of connection elements can be considerably reduced. Here, use can be made of the advantage that the multi-layer body can to have a much lower transparency in the second area or is optionally also formed opaque there. It is thus possible to realize the second electrically conductive layer in a cost-effective manner by means of opaque, electrically conductive areas which are visible for the human eye, for example made of a metal or a conductive silver. Furthermore, it is also possible that the connection areas in the first layer are no longer formed transparent for the human eye in the second area and the connection areas in the second area can thus have a smaller width and a better conductivity.

Every touch panel preferably has a width and/or length between 4 mm and 40 mm, preferably between 6 mm and 20 mm.

Every transmission area and/or receiving area preferably has a width and/or length between 2 mm and 20, preferably between 3 and 10.

The separating gap between the transmission areas and the receiving areas preferably has a width between 5 μm and 1000 μm, in particular between 10 μm and 500 μm. The length of the gap is further preferably between 4 mm and 10 mm.

Furthermore, it is advantageous if the gap between transmission area and receiving area is formed meandering, in particular is formed meandering in every touch panel.

According to a preferred embodiment example of the invention, one, several or all touch panels are formed triangular. Furthermore, it is preferred here if a meandering gap is formed in such a triangular touch panel in each case between the transmission area and the receiving area of the touch panel. It is particularly advantageous here if both the transmission area and the receiving area here have a triangular shape which has comb-shaped recesses on one of its sides and the transmission area interdigitates with the comb-shaped recesses of the receiving area and vice versa. The length of the recesses here is preferably not constant. The length of the recesses here preferably follows the triangular shape. The length of the recesses is thus greatest in the middle of the substructured edge of the triangular transmission or receiving areas and decreases in both directions starting from the middle.

Furthermore, it is possible that the respective separating gap between the transmission areas and the receiving areas has a different width from the gap between the touch panels within the connecting strip conductors which are led out and the respectively adjoining transmission and/or receiving area and is wider or narrower, preferably differs by 20%, in particular by 50%.

According to a preferred embodiment example of the invention, the width and/or spacing of the conductive, opaque tracks in the transmission areas, receiving areas and/or connection areas is chosen such that these areas have an average surface conductivity of between 0.1 ohm (ohm/square) and 10 ohm (ohm/square), preferably between 0.5 ohm (ohm/square) and 2 ohm (ohm/square).

The width of the non-transparent conductive tracks is preferably in the range of between 1 μm and 40 μm, preferably between 5 μm and 25 μm. The thickness of the non-transparent conductive tracks is in the range of between 3 nm and 5 μm, preferably between 40 μm and 1 μm. The conductive non-transparent tracks can be formed here from any electrically conductive material or a mixture of several materials. The tracks here are preferably formed from a metal, in particular from silver, copper, gold, aluminum and/or from an alloy or a conductive paste, as well as from another conductive substance, for example an organic compound with movable charge carriers such as polyaniline, polythiophene and others. All materials can be present doped. Furthermore, in the formation of the pattern, the conductive tracks can be formed by tracks shaped in different ways.

Furthermore, the electrically conductive first layer can also be provided with a contact reinforcement, which serves to improve signal transmission. This can for example consist of conductive silver or carbon black.

The conductive tracks are preferably applied to the carrier substrate in high-resolution patterns. The conductive tracks here consist of one material and are applied with a material thickness with which the first electrically conductive layer appears non-transparent, in particular opaque or at least only semitransparent, for the human observer in the case of formation over the whole surface by means of these materials. The conductive tracks per se are thus non-transparent and have in particular a transmittance of less than 5%, preferably of less than 1%. The transparency which the electrically conductive areas of the receiving, transmission and connection areas have for the human observer in the first area is thus achieved by their small width and thus by the high-resolution structuring of the pattern of conductive tracks, and not by a transparency of the conductive material per se. The transparency can be effected here for example by the above-stated small width of the conductive tracks and also, depending on the material used, by a dimension of the width of the conductive tracks and the spacing thereof of under 250 μm. To avoid moiré and diffraction effects, it is advantageous here to choose a pattern which does not have any periodicity as the pattern for the structuring of the conductive tracks. It is preferred in particular here to dispense with the formation of straight lines and to choose waved and/or jagged lines with for example aperiodic or random structure sequence. Furthermore, it is preferred if the pattern has a plurality of crossover points of such electrically conductive tracks and thus is formed for example from the superimposition of two line grids having a different average spatial direction.

To produce the structuring of the first electrically conductive layer, the electrically conductive material, for example a metal, is preferably applied in the desired layer thickness, for example by sputtering or vapor deposition, and then partially removed again by means of a structuring method, for example positive, negative etching. Furthermore, it is also possible to apply the pattern of conductive tracks by means of printing of a correspondingly conductive substance.

The width of the strip conductor sections of the connection areas is preferably in the range between 300 and 500 μm and the spacing between electrically conductive areas of the first layer, which are to be galvanically separated from each other, is in the range of from 10 μm to 5 mm.

The invention is illustrated by way of example below with reference to several embodiment examples with the aid of the attached drawings.

FIG. 5a to FIG. 5e show schematic representations of arrangements of transmission groups and receiving groups.

FIG. 6a and FIG. 6b show functional representations of areas of the multi-layer body according to FIG. 1.

FIG. 7a and FIG. 7b show schematic representations of the arrangement of transmission and receiving areas for a 2×2 and 4×4 matrix, respectively.

FIG. 9a and FIG. 9b show schematic representations of the arrangement of transmission and receiving areas for a 4×4 and 8×4 matrix, respectively.

Figure 1A:
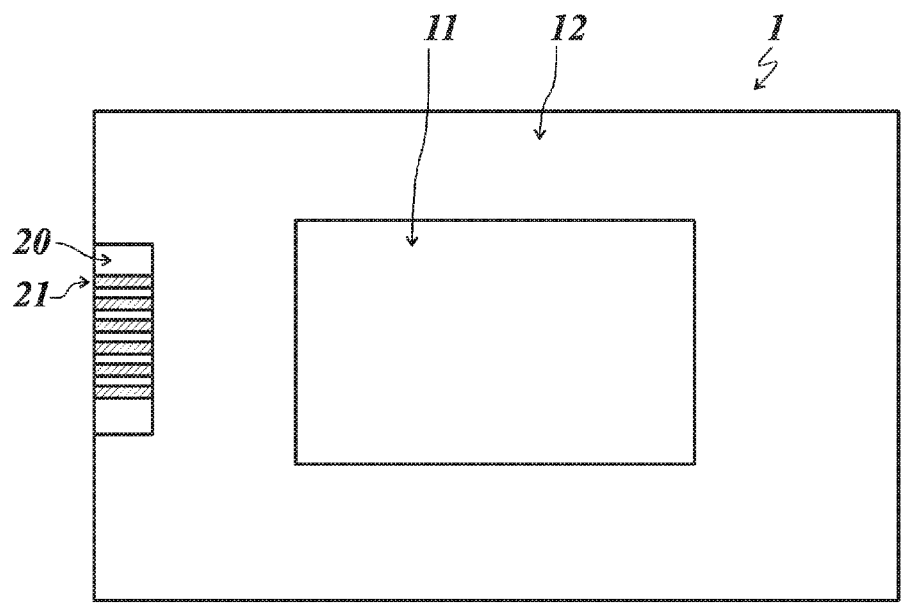
FIG. 1a shows a schematic top view of a multi-layer body.
Figure 1B:
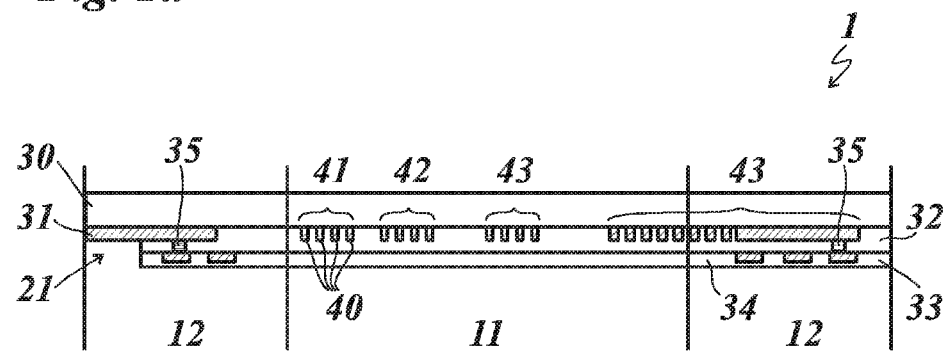
FIG. 1b shows a schematic sectional representation of a multi-layer body.
Figure 2A:
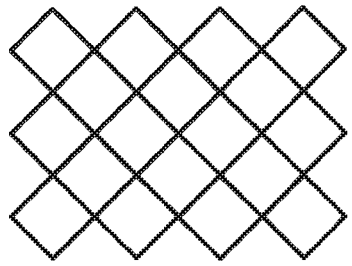
FIG. 2a to FIG. 2d show schematic representations of a section from a pattern of electrically conductive non-transparent tracks.
Figure 2B:
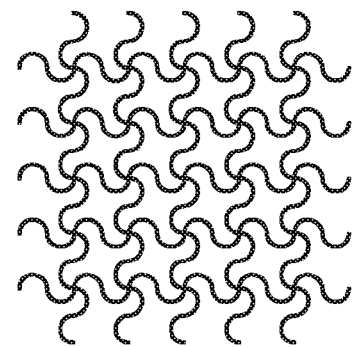
Figure 2C:
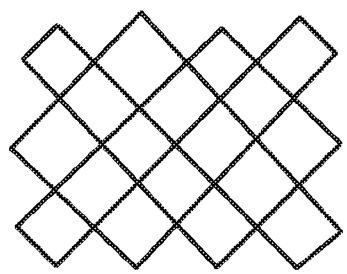
Figure 2D:
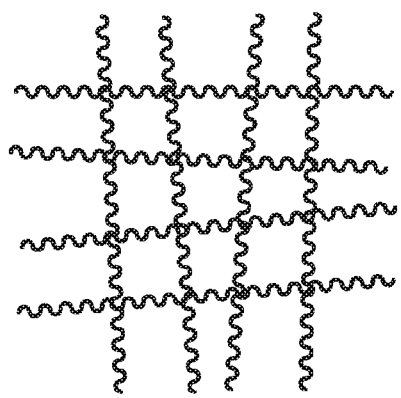

FIG. 1a shows a top view and FIG. 1b a sectional representation of a multi-layer body 1. The multi-layer body 1 has a carrier substrate 30, a first electrically conductive layer 31, a dielectric layer 32, a second electrically conductive layer 33 as well as a dielectric layer 34.

It is also possible that the multi-layer body 1 does not have all of the above-named layers, but only consists of the carrier layer 30 and the first electrically conductive layer 31. Furthermore, it is possible that the multi-layer body 1, in addition to these layers, comprises still further layers, for example one or more decoration layers or further electrically conductive layers.

The multi-layer body 1 has an area 11 in which the multi-layer body 1 appears transparent for the human observer, and an area 12 in which the multi-layer body 1 likewise appears transparent for the human observer, but can also, however, be formed semitransparent or opaque. Furthermore, the multi-layer body 1 has a contact connector 20 with several contact panels 21, via which an electrical contacting of the multi-layer body is possible. However, it is also possible that the multi-layer body 1 does not have such a contact connector and the contacting of electrically conductive layer of the multi-layer body takes place by means of electrically conductive adhesive joints, bonded joints, soldered or welded joints.

The carrier substrate 30 preferably consists of a flexible plastic film, for example of polyethylene (PE), polypropylene (PP), polyvinyl chloride (PVC), polystyrene (PS), polyester (PE) and/or polycarbonate (PC). This film preferably has a layer thickness between 15 μm and 300 μm, preferably between 23 and 100 μm.

The carrier substrate 30 is designed transparent at least in the area 11. The carrier substrate is preferably, however, designed transparent over the whole surface, and thus consists for example of a transparent plastic film.

The first electrically conductive layer 31 preferably consists of a metal, for example copper, aluminum, silver or gold. This metal layer is preferably applied to the carrier substrate 30 in a layer thickness between 20 nm and 100 nm and structured. The structuring preferably takes place here by means of an etching or washing process. Furthermore, it is also possible that, between the carrier substrate 30 and the first electrically conductive layer 31, an adhesion-promoting layer is also arranged, which then improves the adhesion of the first electrically conductive layer 31 to the carrier substrate 30. Such an adhesion-promoting layer is preferably likewise formed from a transparent material.

In the first electrically conductive layer 31, in the first area 11 there are formed a plurality of electrically conductive transmission areas 41, receiving areas 42 and connection areas 43. These electrically conductive transmission areas 41, receiving areas 42 and connection areas 43 in each case consist here of a pattern of electrically conductive, non-transparent tracks 40, the width of which in the first area 11 is chosen such that the electrically conductive transmission areas, receiving areas and connection areas appear transparent for the human eye. The tracks 41 thus have for example a width between 1 μm and 40 μm, preferably between 5 μm and 25 μm. The connection areas 43 in each case connect one or more of the transmission areas 41 or receiving areas 42 to a contact area arranged outside the area 11. It is also possible and also advantageous that the connection areas 43 outside the area 11 are covered with the electrically conductive layer 31 over the whole surface, or are covered with a pattern of electrically conductive, non-transparent tracks 40, the width of which is chosen such that the connection areas 43 in this area, i.e. in the area 12, which do not appear transparent for the human eye. It is hereby possible to increase the conductivity of the connection areas 43 in the area 12, at the expense of the transparency, which is, however, no longer relevant in this area.

Contact areas can be formed here by the contact panels 21 of the contact connector 20, but it is also possible that a contact area represents an area in which the first electrically conductive layer 31 is contacted, for example over a via, with another electrically conductive layer, or can also be formed by an area of the first electrically conductive layer 31 in which a connection track (appearing opaque for the human observer) of the electrically conductive layer 31 passes into a connection area (appearing transparent for the human observer).

As indicated in FIG. 1, the contact panels 21 of the contact connector 30 are also formed in the first electrically conductive layer 31. However, it is also possible that the contact panels 21 are formed, not in the electrically conductive layer 31, but in another electrically conductive layer, for example in the electrically conductive layer 33. In the area of the contact panels 31, the first electrically conductive layer 31 can here have a larger layer thickness or else be boosted with another or the same electrically conductive material.

The dielectric layer 42 is then applied to the first electrically conductive layer 31. The dielectric layer 42 is preferably a transparent varnish which is applied to the electrically conductive layer 31 by means of a printing process in a layer thickness of from 1 μm to 40 μm. It is advantageous here if, in the areas in which vias 35 are to be provided later, no material is already applied when the dielectric layer 32 is applied.

Furthermore, the electrically conductive layer 33 is then applied. The second electrically conductive layer 33 is preferably a layer which is applied by printing an electrically conductive printing material, for example carbon black or conductive silver. During printing, the recesses provided in the dielectric layer 32 here can simultaneously be filled with the printing material and thus the vias 35 through the dielectric layer 32 can simultaneously be filled with conductive material. The conductive layer 33 is preferably structured such that, by means of this layer, several of the connection areas 43 of the electrically conductive layer 31 are electrically connected to each another and thus the number of contact panels 21 of the contact connector 20 can be reduced, as is also described in detail later.

In the area 11 next to the electrically conductive layer 31, further electrically conductive layers are preferably no longer provided in the multi-layer body 1.

The conductive tracks 40 in the transmission areas, receiving areas and connection areas are preferably arranged according to a pattern illustrated in Figures FIG. 2a to FIG. 2d. As shown there, the electrically conductive tracks 40 are here arranged not parallel to each other as far as possible in order to avoid diffraction and moiré effects, and furthermore have a plurality of crossover points in order to thus provide as uniform as possible a surface conductivity in the transmission areas 41, receiving areas 42 and connection areas 43.

Figure 3:
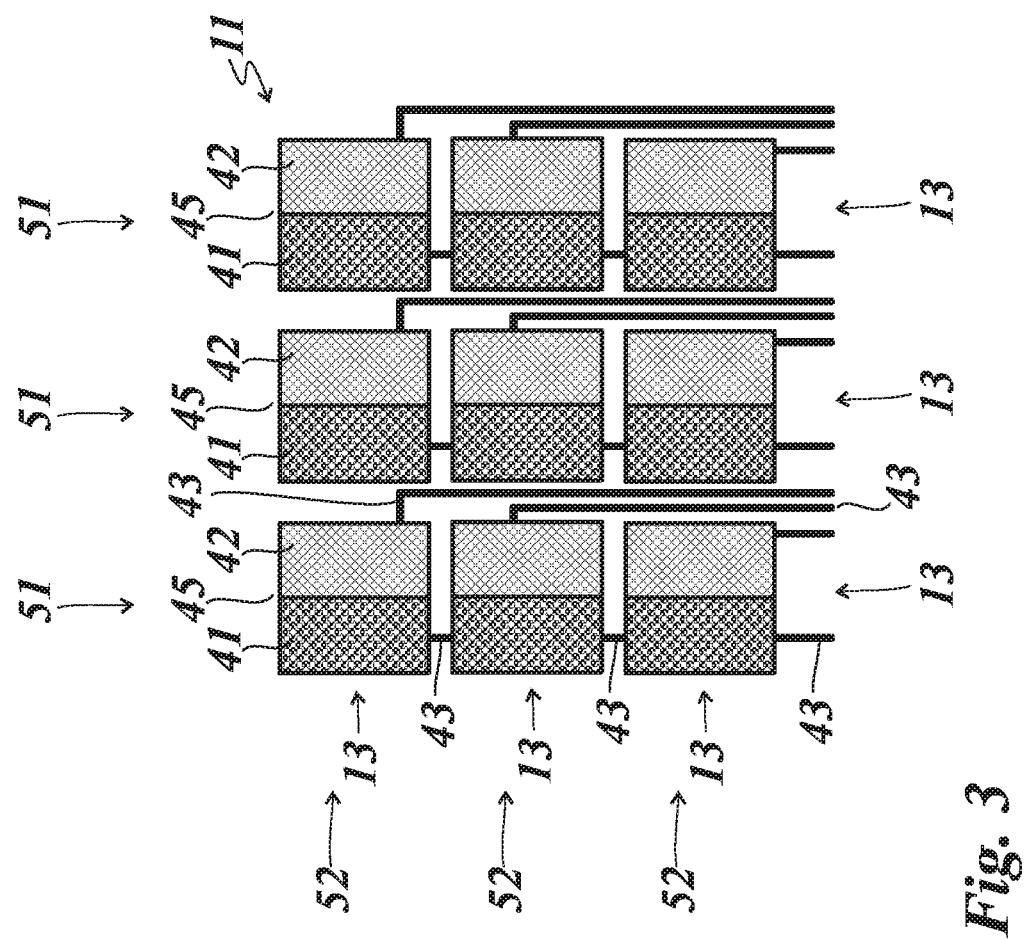
FIG. 3 shows a schematic representation of a matrix with several touch panels.

The touch panels arranged in the area 11 are preferably arranged according to a 2-dimensional matrix with two or more columns and two or more rows, as is illustrated with the help of FIG. 3.

FIG. 3 shows a section from the area 11 with new touch panels 13, which are arranged in the form of a matrix with three rows 53 and three columns 51. Here, each touch panel 3 has one of the electrically conductive transmission areas 41 and one of the electrically conductive receiving areas 42, which are formed in the first electrically conductive layer 31, as explained above. In FIG. 3, an arrangement is shown here in which a transmission area 51 is provided in the left half of each of the touch panels 13 and a receiving area 42 is provided in the right half, and the transmission area 41 here is galvanically separated from the receiving area 42 by a gap 45. The width of the gap 45 is preferably between 5 µm and 1000 µm, further preferably between 10 µm and 500 µm. The length of the gap is preferably 2 mm to 16 mm and further preferably between 4 mm and 8 mm. In the representation according to FIG. 3, the transmission areas 41 and 42 have a rectangular shape. They can, however, also have a different shape, for example a triangular shape, a shape of another polygon or of a subarea of a conic section. Furthermore, in FIG. 3, several connection areas 43 are shown, which connect transmission areas and receiving areas to contact areas arranged outside the area 11.

As shown in FIG. 3, in such an arrangement of transmission areas 41 and receiving areas 42, it is necessary here to provide twelve connection areas 43, in order to contact all of the transmission areas 41 and receiving areas 42 such that these can be controlled individually.

Figure 4A:
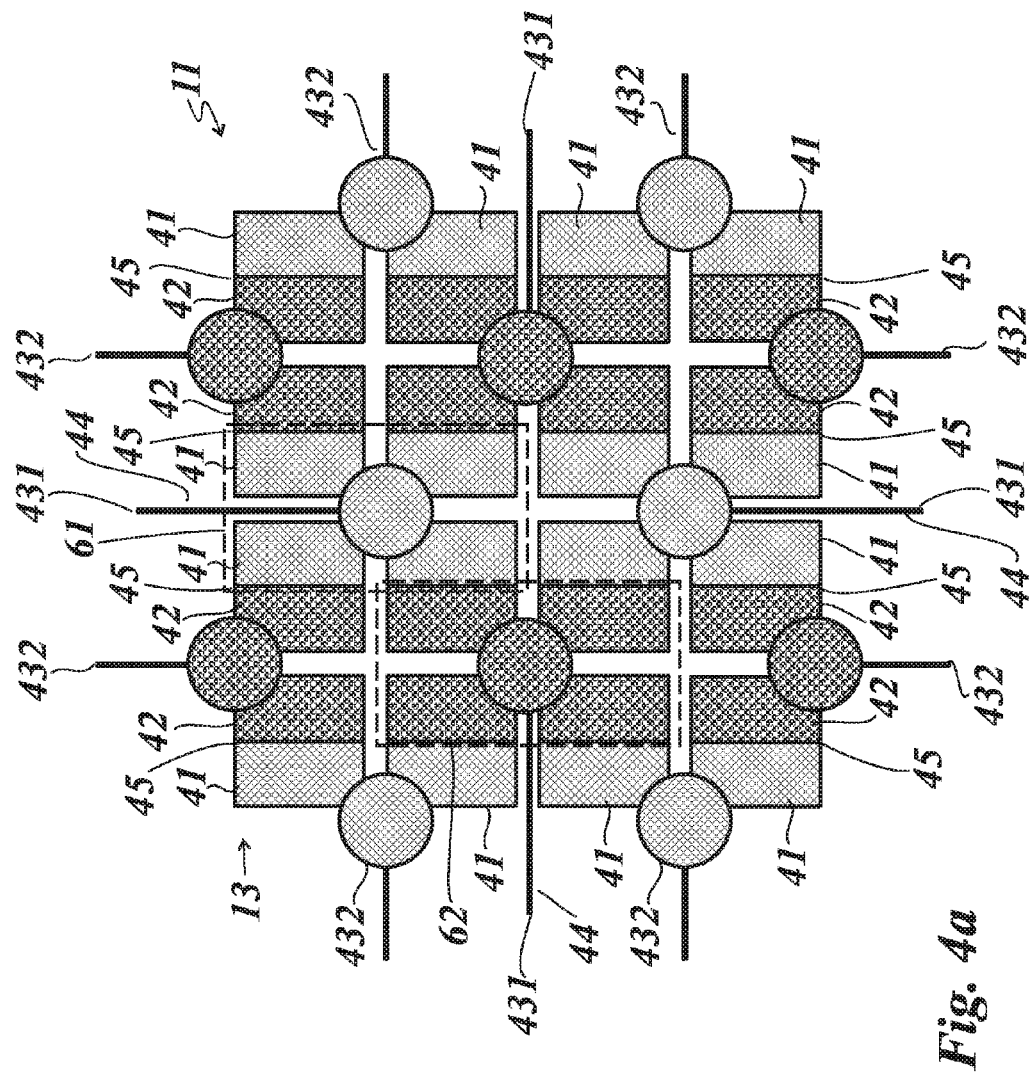
FIG. 4a and FIG. 4b show a matrix with a plurality of touch panels and a specific arrangement of transmission and receiving areas of the touch panels.

FIG. 4a now shows a further arrangement of transmission areas 41 and receiving areas 42 in the area 11, which has clear advantages compared with the arrangement shown in FIG. 3.

FIG. 11a thus shows a 4×4 matrix of touch panels 30, which each have a transmission area 41 and a receiving area 42, which are separated from each other by a gap as shown with the help of FIG. 3. With respect to the possible formation of the transmission areas 41 and receiving areas 42, reference is made to the embodiments according to FIG. 3. Furthermore, FIG. 4a also shows a plurality of connection areas 431 and 432, which each electrically connect two or more of the transmission areas 41 or two or more of the receiving areas 42 to each other and to a contact area arranged outside the area 11. The connection of two or more transmission areas 41 or receiving areas 42 is schematically indicated here in FIG. 4a by a dot. Here, the connection areas 431 each connect four transmission areas 41 or four receiving areas 42 and the connection areas 432 each connect two transmission areas 41 or two receiving areas 42.

This advantageous coupling of two or more of the transmission areas 41 and/or receiving areas 42 is achieved here in particular by the fact that in the rows from touch panel 13 to touch panel 13 the arrangement of transmission areas 41 and receiving areas 42 relative to each other alternates.

In each case two transmission areas 41 or two receiving areas 42 are thus opposite each other at the boundary between two touch panels 13 of a row and can thus be connected in an electrically conductive manner to each other and to a contact area through a common connection area 43.

The touch panels 13 of the matrix are thus preferably selected from two groups of touch panels 13, wherein in a first group of touch panels 13, the transmission area 41 is arranged on the left in each case, and in particular in the left half, and the receiving area 42 is arranged on the right, and in particular in the right half, of the respective touch panel 13, and in the touch panels 13 of a second group of touch panels, the transmission area 41 is arranged on the right in each case, and in particular in the right half, and the receiving area 42 is arranged on the left, and in particular in the left half, of the respective touch panel 13. In one or more, preferably each, of the rows of the matrix, alternating panels of the first group and of the second group are arranged next to each other in the following, as is shown in FIG. 4a, with the result that two transmission areas 41 or two receiving areas 42 are opposite each other at the boundaries between two touch panels 13 of the same row in each case.

Furthermore, it is also possible that such an alternating arrangement of touch panels of the first group and of the second group is provided in one or more or each of the columns, as is also explained later.

Furthermore, in the arrangement according to FIG. 4a, it is also provided in an advantageous manner that in each case touch panels of the same group of touch panels are arranged in each of the columns, i.e. in each of the columns, the transmission areas 41 and the receiving areas 42 are opposite each other in each case at the boundary between two touch panels 13 of the columns, as is shown in FIG. 4a. This also makes it possible, as is shown in FIG. 4a, to connect receiving areas 41 or transmission areas 42 arranged adjacent to each other in an advantageous manner to connection areas 43.

As is shown in FIG. 4a, such an arrangement makes it possible to contact four transmission areas and/or four receiving areas in each case by means of a common connection area 431. Furthermore, four such transmission areas arranged adjacent to each other form a transmission group 61 and four such receiving areas arranged adjacent to each other form a receiving group 62, which groups are indicated in FIG. 4a by correspondingly dashed lines. As can be seen from the representation according to FIG. 4a, one or more of such transmission groups 61 or receiving groups 62 are thus advantageously arranged in the column direction, and transmission groups 61 and receiving groups 62 alternate in the row direction. The transmission groups 61 and receiving groups 62 are thus offset from each other in a checkered pattern, wherein the centroids of the adjacent arrangement of successive transmission groups or receiving groups in the column direction are shifted with respect to each other by a half cycle.

Furthermore, it is advantageous if the connection areas 43 have strip conductor sections 44 which run from inside to outside in relation to the area 11 and which preferably run in the boundary area between two columns or two rows of the matrix. Furthermore, it is advantageous here if these strip conductor sections, as is shown in FIG. 4a for the strip conductor sections 44 of the connection areas 431, run towards all sides from inside to outside and thus have a stellate arrangement. It is hereby possible to greatly reduce the path lengths of the connection areas and to avoid the crossing of strip conductors.

Figure 4B:
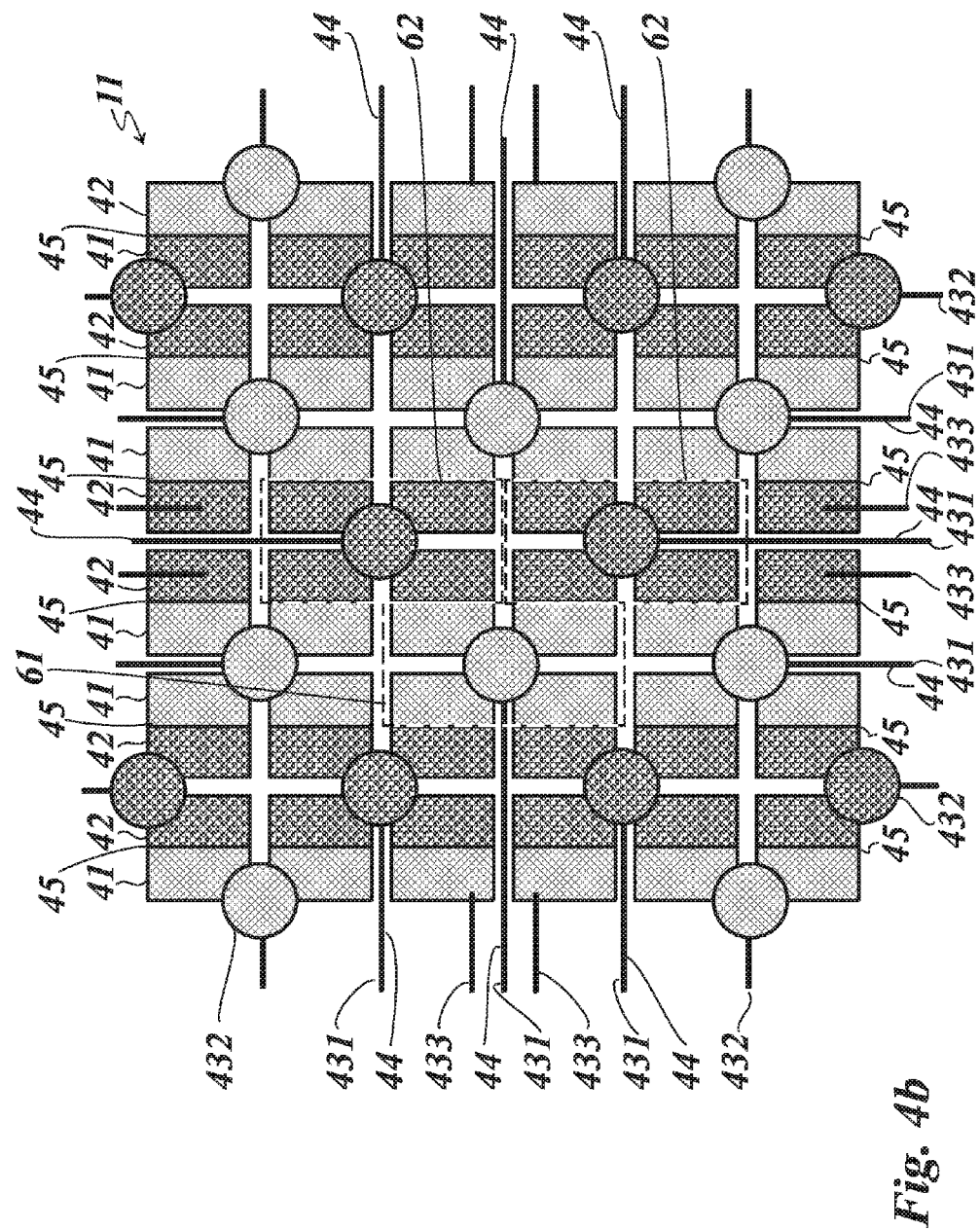

FIG. 4b shows a further embodiment of the arrangement of touch panels 13 within the area 11 which follows the same construction principle as the arrangement according to FIG. 4a.

The arrangement according to FIG. 4b is a matrix with 6×6 touch panels 13. Each of the touch panels 13 has a transmission area 41 and a receiving area 42. The arrangement of transmission and receiving areas 41 and 42 alternates here in every row and is constant in every column, corresponding to the arrangement principle according to FIG. 4a. Here too, transmission areas 41 and receiving areas 42 arranged adjacent to each other in each case are combined into transmission groups 61 and receiving groups 62, respectively, which are provided in a checkered arrangement. These transmission groups 61 and receiving groups 62 are contacted here by connection areas 431. Furthermore, transmission and receiving groups which are each formed from only two transmission areas 41 or receiving areas 42, respectively, are contacted by connection areas 432. Transmission areas 41 and receiving areas 42 which are contacted with each other in each case via a connection area of their own are formed by the connection areas 433. Here too, the stellate arrangement of the strip conductor sections 44 of the connection areas can be clearly seen.

Figure 5A:
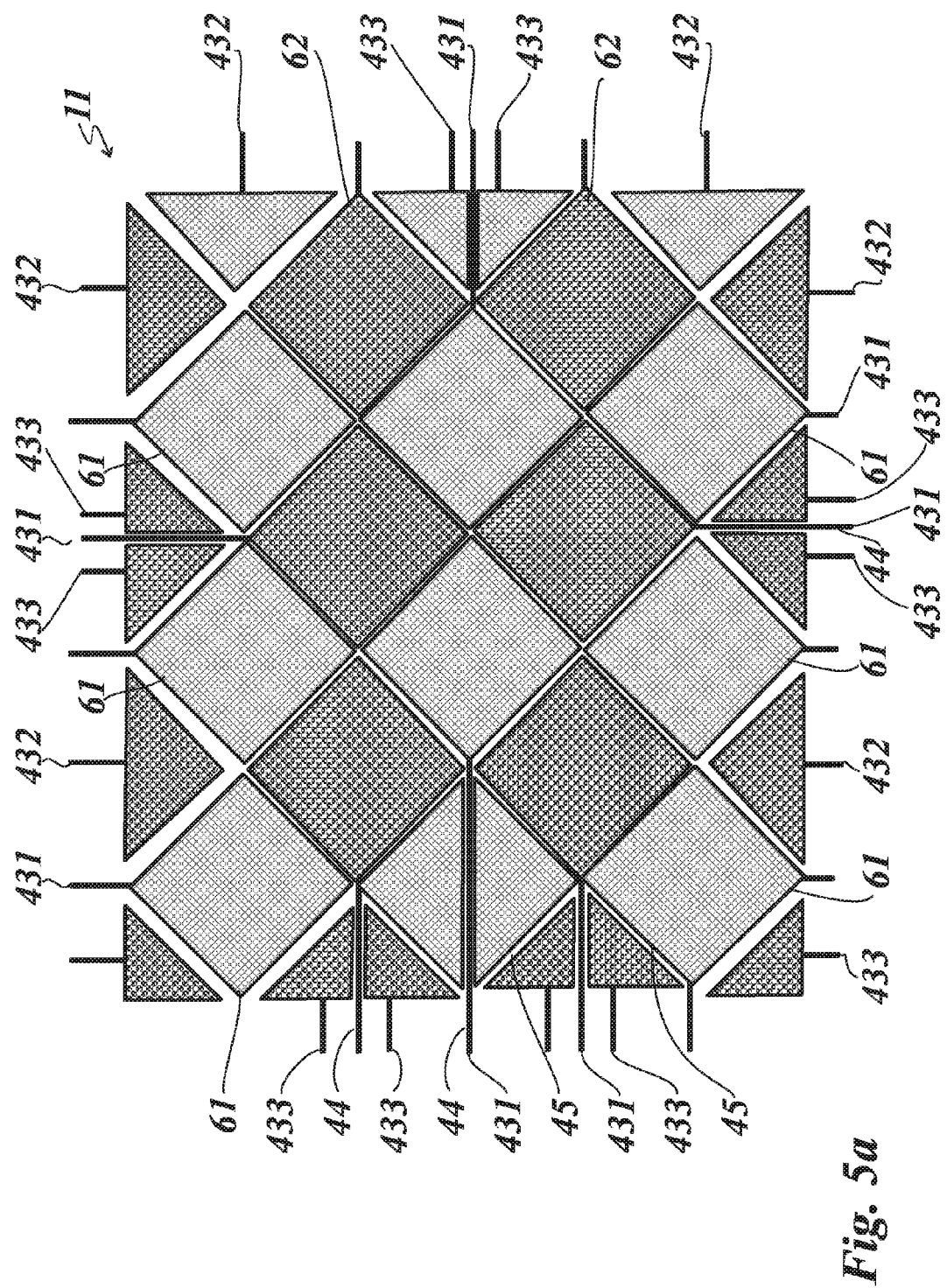

FIG. 5a shows a further arrangement of transmission areas and receiving areas within the area 11.

This arrangement is based principally here on the same construction principle as the arrangement according to FIG. 4a and FIG. 4b. For one thing, in each case four transmission areas or receiving areas which are arranged adjacent to each other are combined here into a transmission group 61 or receiving groups 62, respectively, and these transmission groups 61 and receiving groups 62 are, as arranged in FIG. 5a, arranged offset from each other in a checkered pattern relative to each other. The receiving areas and transmission areas, which are combined in each case into a transmission group or receiving group, are arranged here in such a way that they abut directly against each other or are connected by a common connection area to form a common geometric figure, in this case a square. In total, in each case two or four transmission or receiving areas arranged next to each other are thus connected here to form a common electrically conductive area which has a square or triangular shape. These areas can, however, also have a rectangular or octagonal shape.

Furthermore, in the arrangement according to FIG. 5a, the direction of orientation of the columns and rows of the matrix is also tilted by an angle of 45° with respect to the area 11.

Furthermore, the transmission groups 61 and receiving groups 62 lying inside the are, as shown in FIG. 5a, contacted by connection areas 431. Furthermore, connection areas 432 are also provided, which each contact transmission groups or receiving groups which are formed by two receiving areas or two transmission areas. Furthermore, connection areas 433 are also provided, which each contact only one receiving area or transmission area. As also arises from this, in the embodiment according to FIG. 5a, the transmission areas and receiving areas have a triangular shape per se and can thus be combined into a common transmission group or receiving group in a simple way.

As shown in FIG. 5a, also in the arrangement according to FIG. 5a connection areas have strip conductor sections 44 which run outwardly in a stellate manner towards all sides. These connection areas then each divide a "virtual" transmission group or receiving group with four or two transmission areas or receiving areas, with the result that these transmission or receiving groups split into two parts, which are each contacted individually.

FIG. 5b shows a section of the area 11 in which an embodiment variant of the arrangement according to FIG. 5a is realized. This arrangement also has an arrangement of transmission groups 61 and receiving groups 62 offset in a checkered pattern, with assigned strip conductor sections 44 and 441. As shown in FIG. 5b, the corners of the transmission groups 61 and receiving groups 62 are geometrically shortened, with the result that the transmission groups 61 and receiving groups 62 have an octagonal shape. This creates more space for the connection areas led outwardly, with the result that these can be designed redundant (e.g. 3-line account grids instead of 2-line account grids). This does not have an influence on the electrical function, but increases the production yield. In order to make possible a uniform sensitivity and an optical homogeneity, unconnected electrically conductive areas 63 can be placed in the intermediate spaces through which no connection areas are led.

Figure 5C:
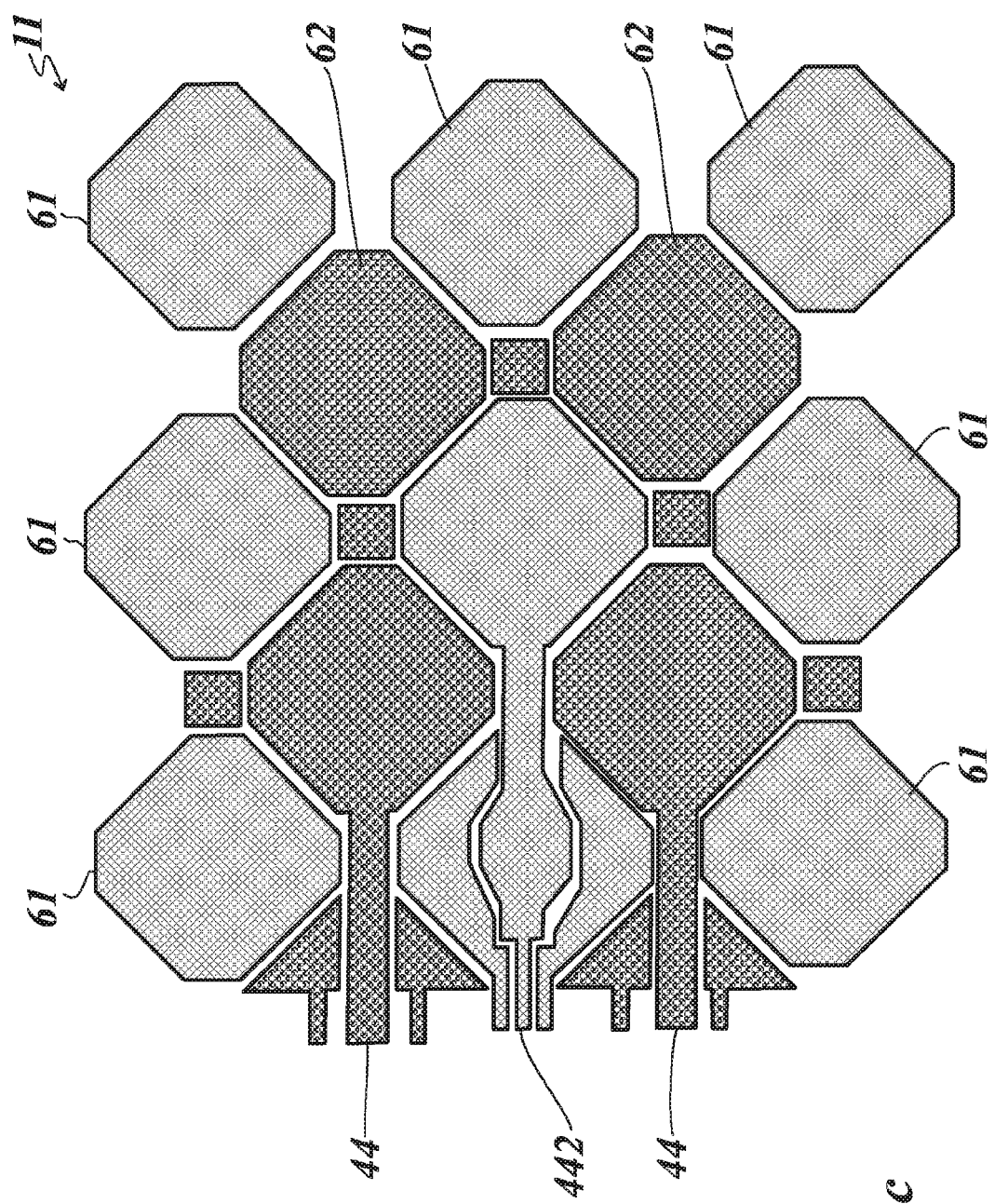

FIG. 5c shows a further variation of the arrangement according to FIG. 5b. As shown in FIG. 5c, inner transmission groups 61 and receiving groups 62 are contacted by connection areas 43 via strip conductor sections 44. These strip conductor sections divide (virtual) transmission groups and receiving groups, as has already been explained with the help of FIG. 5a. As shown in FIG. 5c with the help of the strip conductor section 442, a widening is arranged in one or more of these strip conductor sections in the area in which they divide these (virtual) transmission groups or receiving groups. This likewise increases the production yield and does not alter the electrical function of the touch panels 13, as the recognition essentially takes place on the meeting edges between transmission areas and receiving areas.

Figure 5D:
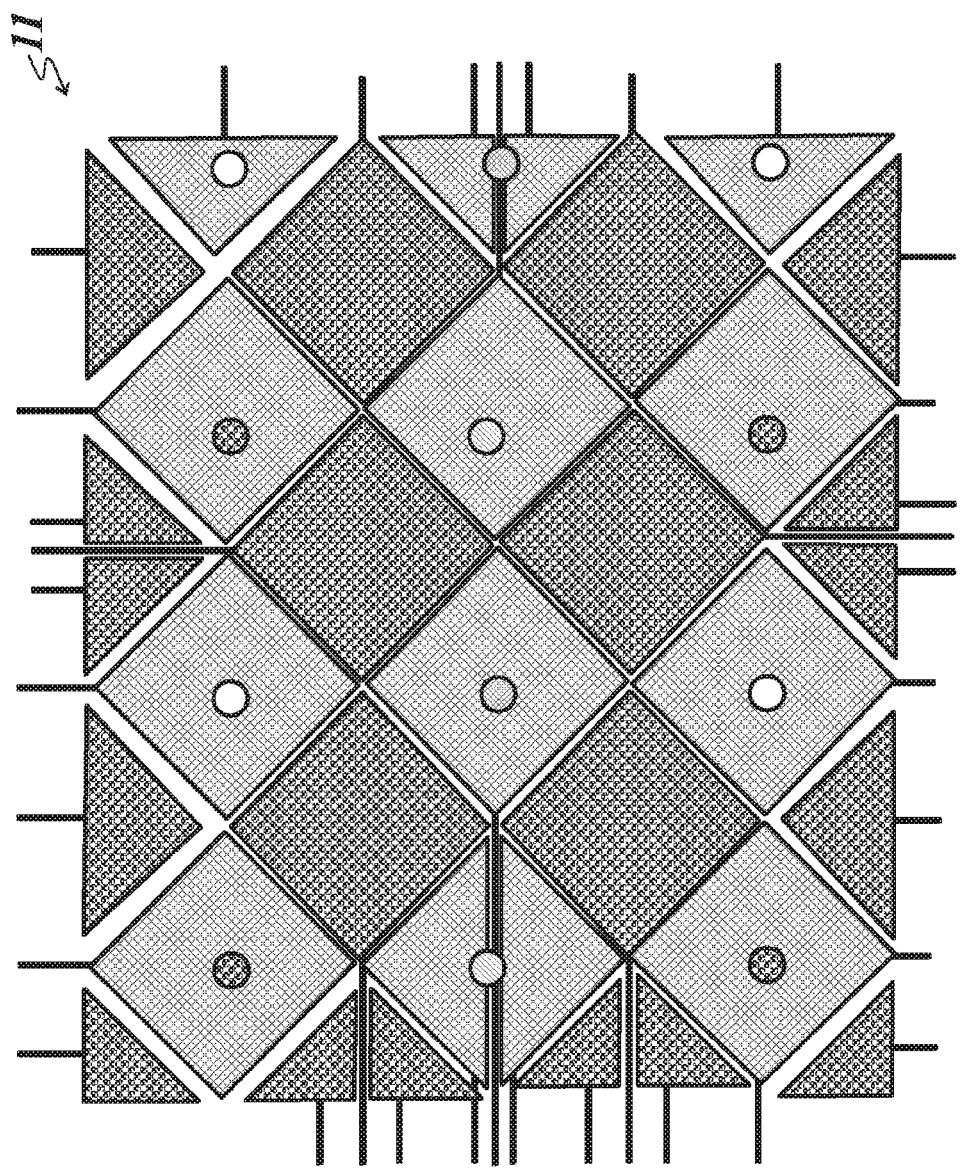
Figure 5E:
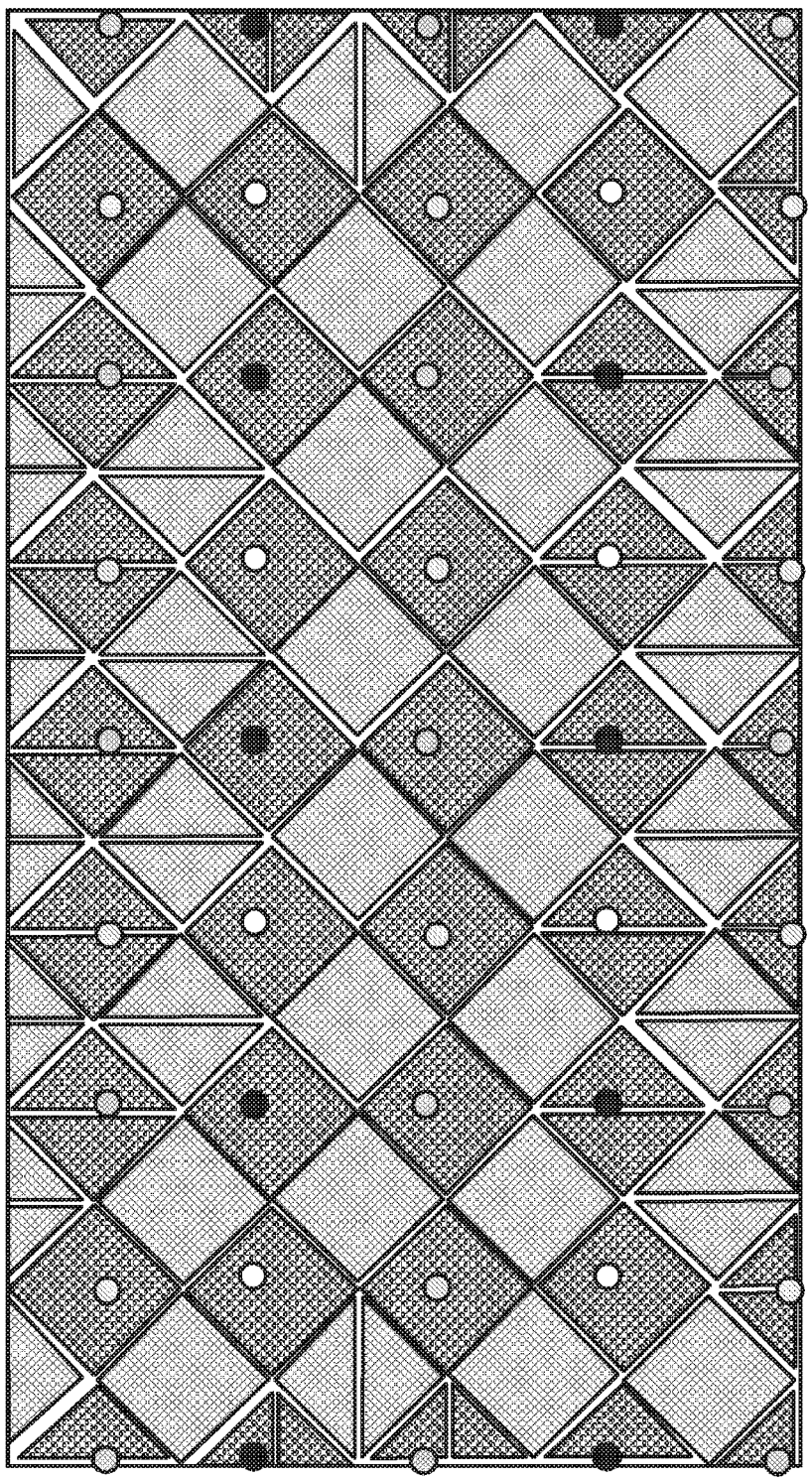

Figures FIG. 5d and FIG. 5e show a section of the area 11 in which a matrix with 6×7 touch panels 13 or with 9×16 touch panels 13, respectively, is arranged. The arrangement of the transmission areas and receiving areas is carried out here according to the construction principle according to FIG. 5a, with the result that reference is made to the respective embodiments according to FIG. 5a in respect.

As can be seen from these representations, the grouping of transmission areas and receiving areas into transmission groups and receiving groups, respectively, is primarily designed here such that in each case four transmission groups are adjacent to each receiving group, which transmission groups are each contacted via a connection area of their own or vice versa. This is indicated by a dot in Figures FIG. 5d and FIG. 5e, which dot characterizes the different transmission groups.

Figure 6B:
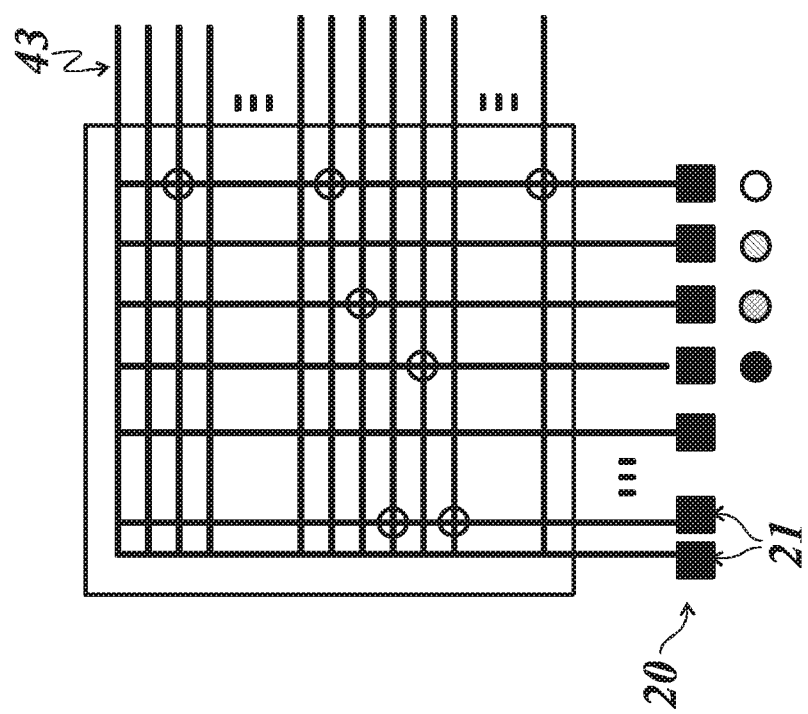

The joining of connection areas 43 led out of the area 11 to the contact surfaces 21 of the contact connector 20 is shown in Figures FIG. 6a and FIG. 6b by way of example.

FIG. 6a shows here, for one thing, the area 11 with an arrangement, formed according to FIG. 5a, of transmission areas and receiving areas, which are combined in each case into transmission groups and receiving groups. The transmission groups are characterized here by dots. The connection areas 43 led out of the area 11 are then connected in an electrically conductive manner to the contact panels 21 of the contact connector 20 by means of the coupling matrix shown in FIG. 6. This coupling preferably takes place here via the second electrically conductive layer 33 and can thus, for example, take place by printing a structured insulator layer, the dielectric layer 32, and by the printing strip conductors as electrically conductive layer 33, for example by printing conductive silver.

By forming the multi-layer body 1 according to the Figures FIG. 1a to FIG. 2d and FIG. 4a to FIG. 6b, it is thus possible to drastically reduce the number of connection areas, the length of the connection areas, and the surface coverage of the connection areas in the area 11, and to provide only one strip conductor plane in the visible area, i.e. in the area 11, and therefore to avoid optical problems of an interaction of two strip conductor planes (moiré effects). Furthermore, the bias arises that connection track sections of connection areas led outwardly out of the area 11 do not have to be protected, as no connection areas of transmission areas 41 and receiving areas 42 are next to each other.

Furthermore, similar advantages can be achieved with a formation of the arrangement of transmission areas 41 and receiving areas 42 according to one of the following embodiment variants according to Figures FIG. 7a to FIG. 12c.

FIG. 7a shows an arrangement of transmission areas 41 and receiving areas 42 of a matrix with 2×2 touch panels 13. As shown in FIG. 7a, touch panels 13 follow on from each other here in the rows of the matrix, which touch panels have an inverse arrangement of transmission areas 41 and receiving areas 42, with the result that, at the boundary between two successive touch panels of a row, in each case two transmission areas 41 or two receiving areas 43 are successive to each other. Furthermore, touch panels 13 with an inverse arrangement of transmission areas 41 and receiving areas 42 also follow on from each other in each case in every column, with the result that, at the boundary between two touch panels 13 of a column, a transmission area 41 and a receiving area 42 or a receiving area 42 and a transmission area 41 are opposite each other in each case, as is shown in FIG. 7a.

Touch panels 13 of the first group and second group thus alternately follow on from each other both in the rows and in the columns.

In the intermediate spaces between two touch panels 13 of the same row, two transmission areas 41 or two receiving areas 42 are thus opposite each other in each case and transmission areas 41 and receiving areas 42 are opposite each other in each case at the boundary between the two touch panels 13 of the same column.

Furthermore, the transmission areas 41 and receiving areas 42 are preferably electrically connected to each other here by connection areas 43 such that at least x/2 transmission areas or x/2 receiving areas are connected to each other, wherein x denotes the number of rows (rounded down in the case of an odd number).

Furthermore, connection areas 43 are preferably provided which are led out of the matrix in a double comb-shaped manner, with the result that no crossover of the strip conductor sections of the connection areas occur. With fewer than 5 rows, a double comb is not necessary.

Furthermore, it is preferred if the receiving areas 41 or the transmission areas 42 are electrically connected to each other along the comb back or the double-comb back via the connection areas 43.

FIG. 7a thus shows, for one thing, connection areas 432, which each electrically connect two transmission areas 41 or two receiving areas 42 to each other, as well as connection areas 433, which each connects a transmission area 41 or a receiving area 42 to a corresponding contact area.

As shown in FIG. 7a, two of the connection areas 432 are formed here such that they connect the transmission areas of the respective column to each other and one of the connection areas 432 is formed such that it electrically connects two opposite receiving areas 42 of a row to each other.

FIG. 7b shows a matrix with 4×2 touch panels 13. The matrix consists here of two subareas 71 and 72. Each of the subareas 71 and 72 follows the construction principle according to FIG. 7a here with regard to the arrangement of the transmission areas 41 and receiving areas 42 of the touch panels 13, as can also be seen from FIG. 7b. Here too, connection areas 43, which each electrically connect the transmission areas 41 of a column to each other, are provided in each of the subareas 71 and 72. Furthermore, a connection area 42 is provided, which connects to each other in an electrically conductive manner four receiving areas 42 which are adjacent to each other.

Figure 8B:
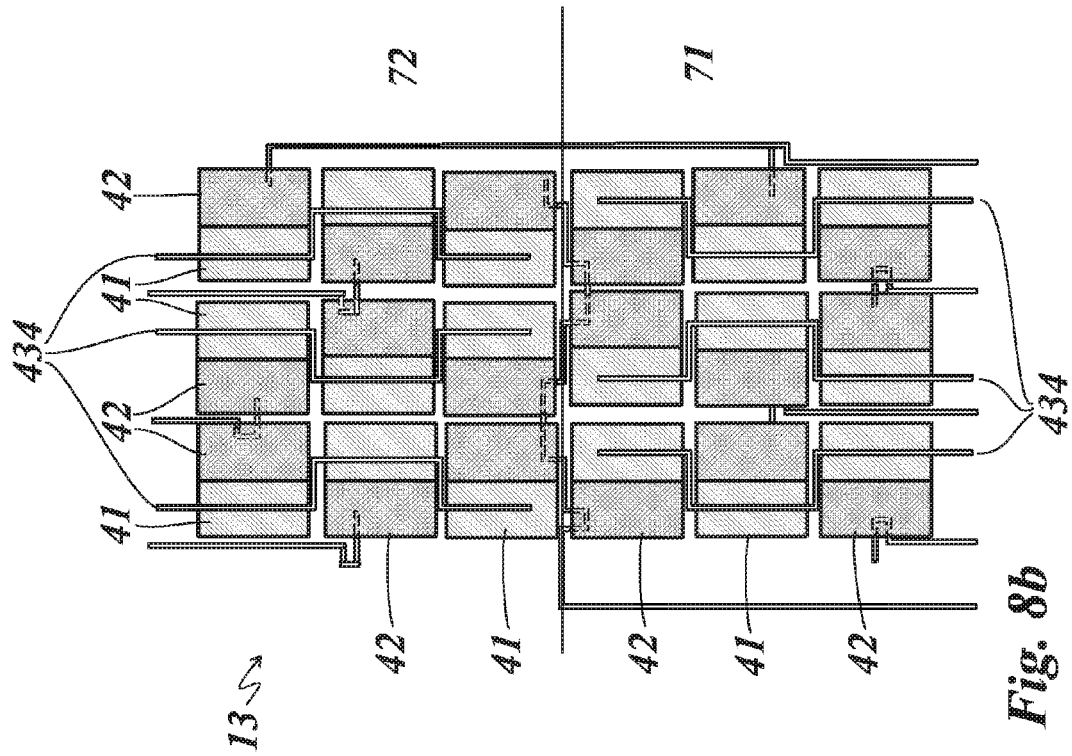
FIG. 8a and FIG. 8b show schematic representations of the arrangement of transmission areas and receiving areas for a 3×3 and 6×3 matrix, respectively.
Figure 8A:
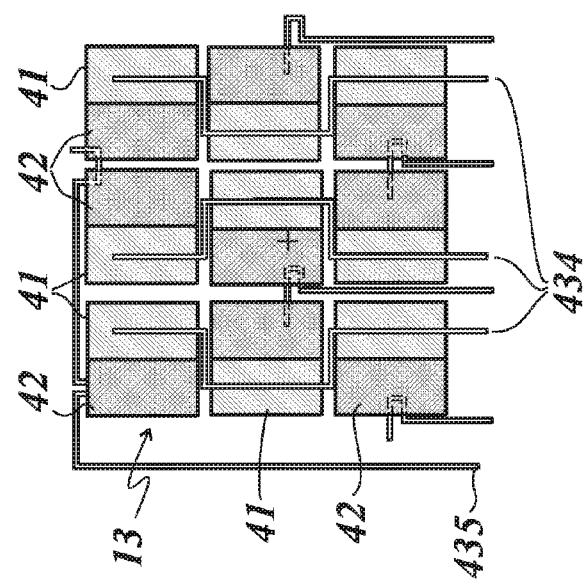

FIG. 8a shows a matrix with 3×3 touch panels 13. The arrangement of the transmission areas 41 and receiving areas 42 of the matrix here follows the operating principle explained with the help of FIG. 7a. Here too, connection areas 434 are provided, which each electrically connect the transmission areas 41 of a column to each other, with the result that three transmission areas 41 are connected to each other here.

FIG. 8b shows a matrix with 6×3 touch panels 13. This matrix consists of two subareas 71 and 72, wherein both subareas 71 and 72 follow the construction principle according to FIG. 8a, in particular with regard to the arrangement of the receiving areas 41 and receiving areas 42 of the touch panels 13 relative to each other, as well as with regard to the formation of connection areas 434, which each electrically connect all transmission areas 41 of a column of the respective subarea to each other.

FIG. 9a and FIG. 9b show a matrix with 4×4 touch panels 13 and a matrix with 8×4 touch panels 13, respectively. The arrangement of the transmission areas 41 and receiving areas 42, as well as the formation of the connection areas 443, here follows the construction principles illustrated with the help of Figures FIG. 8a and FIG. 8b, with the result that reference is made to the embodiments according to FIG. 7a to FIG. 8b in this respect. It is also advantageous here that all receiving areas 42 of the uppermost row of the arrangement according to FIG. 9a are contacted with each other via a common connection area 435.

Figure 10B:
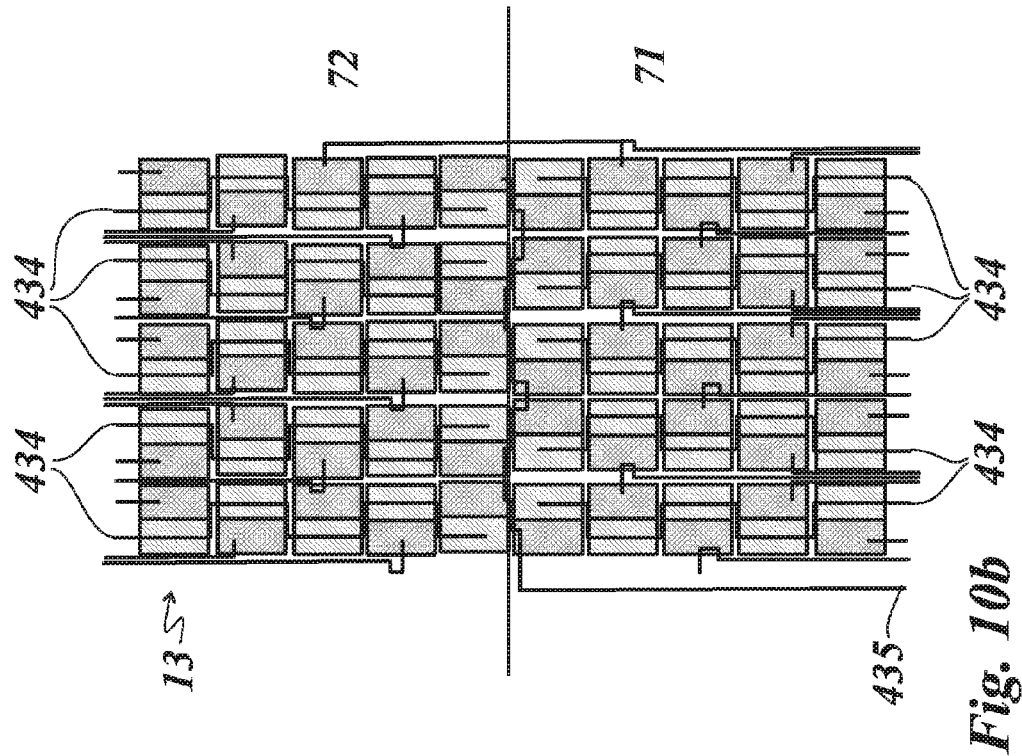
FIG. 10a and FIG. 10b show schematic representations of the arrangement of transmission areas and receiving areas for a 5×5 and 10×5 matrix, respectively.
Figure 10A:
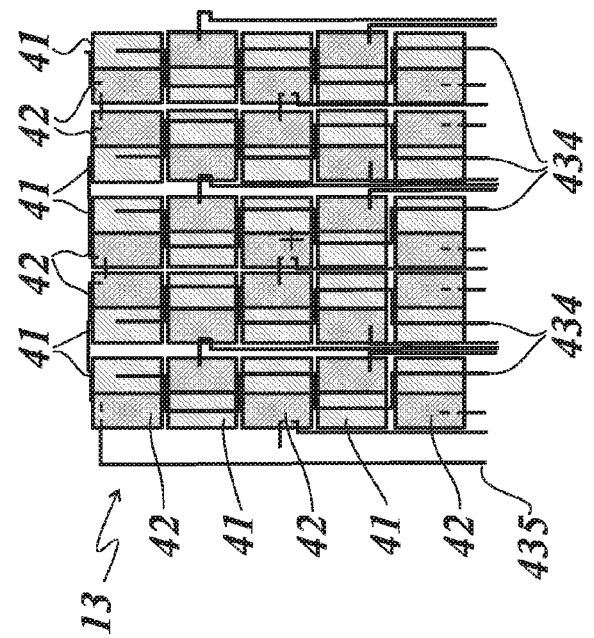

FIG. 10a and FIG. 10b show a matrix with 5×5 touch panels 13 and 10×5 touch panels 13, respectively. The arrangement of the transmission areas 41 and receiving areas 42, as well as the connection areas 434 and 435 corresponds here to the previously explained construction principles, with the result that reference is made to the embodiments according to FIG. 7a to FIG. 9b in this respect.

Figure 11:
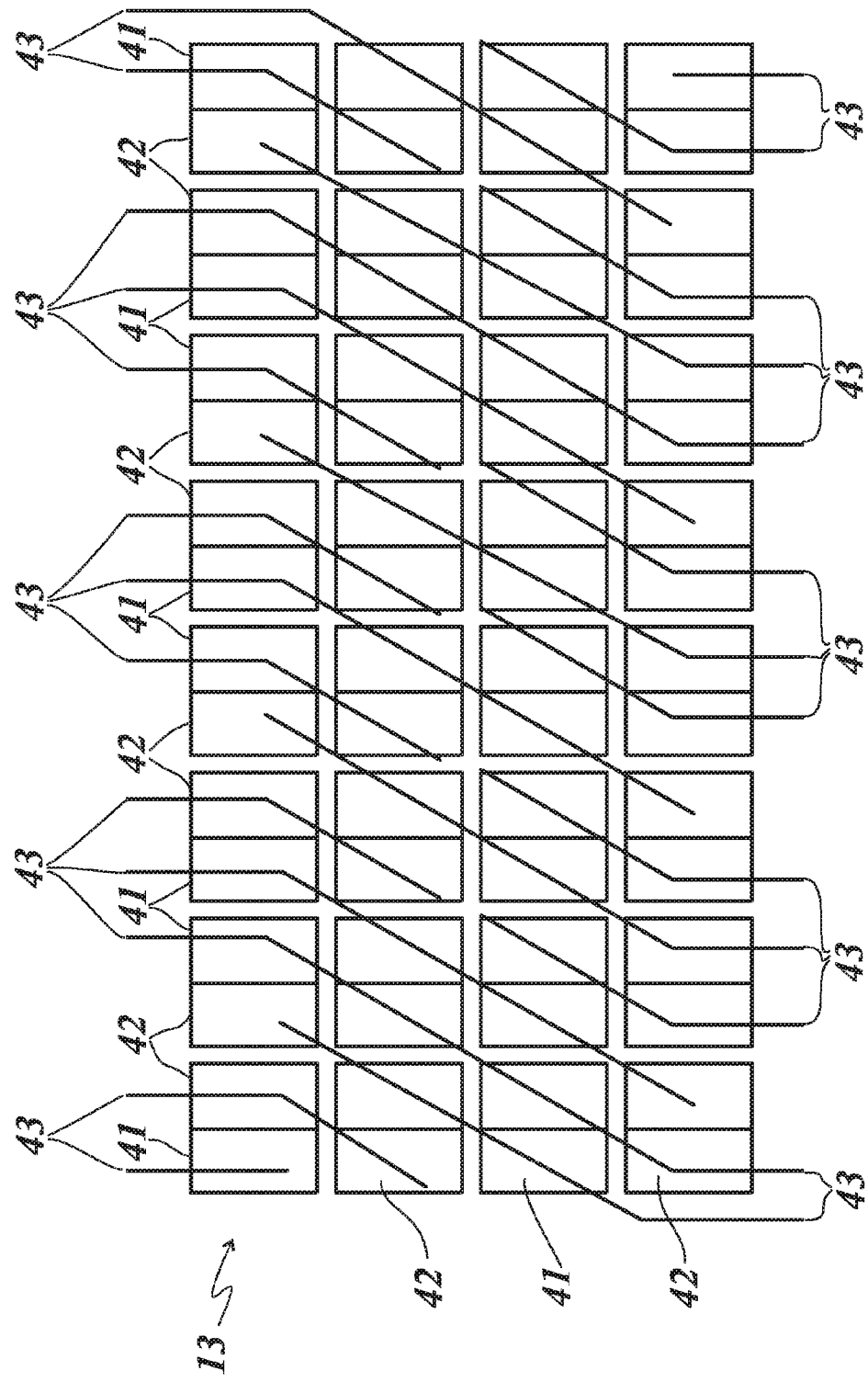
FIG. 11 shows a schematic representation of the arrangement and contacting of transmission and receiving areas.

FIG. 11 shows a matrix with 4×8 touch panels 13. The arrangement of the transmission areas 41 and receiving areas 42 here follows the construction principle already illustrated with the help of FIGS. 7a, 8a, 9a and 10a. Furthermore, connection areas 43 are shown in FIG. 11, which each contact one, two or four transmission areas 41 or receiving areas 42 to each other. It is particularly advantageous here that the connection areas 43 connecting two or four transmission areas 41 or receiving areas 42 each have interconnections which connect to each other transmission areas or receiving areas, respectively, which are transverse to each other. The alternating design of the transmission areas 43 on the top and bottom of the matrix as shown in FIG. 11 is also further advantageous here.

Figure 12A:
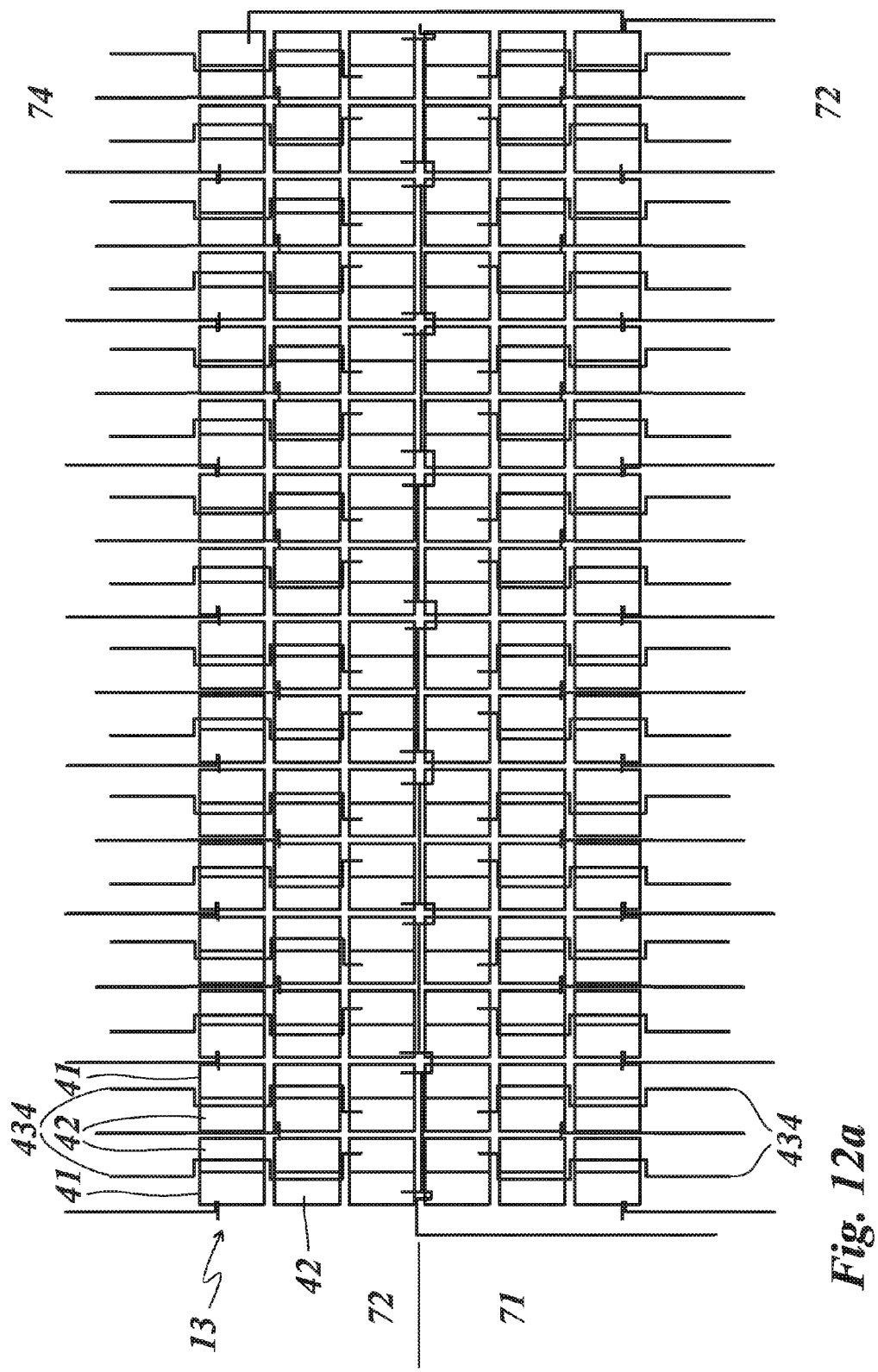
FIG. 12a to FIG. 12c show schematic representations of the arrangement of transmission and receiving areas for a 6×16, 8×14 and 8×16 matrix, respectively.
Figure 12B:
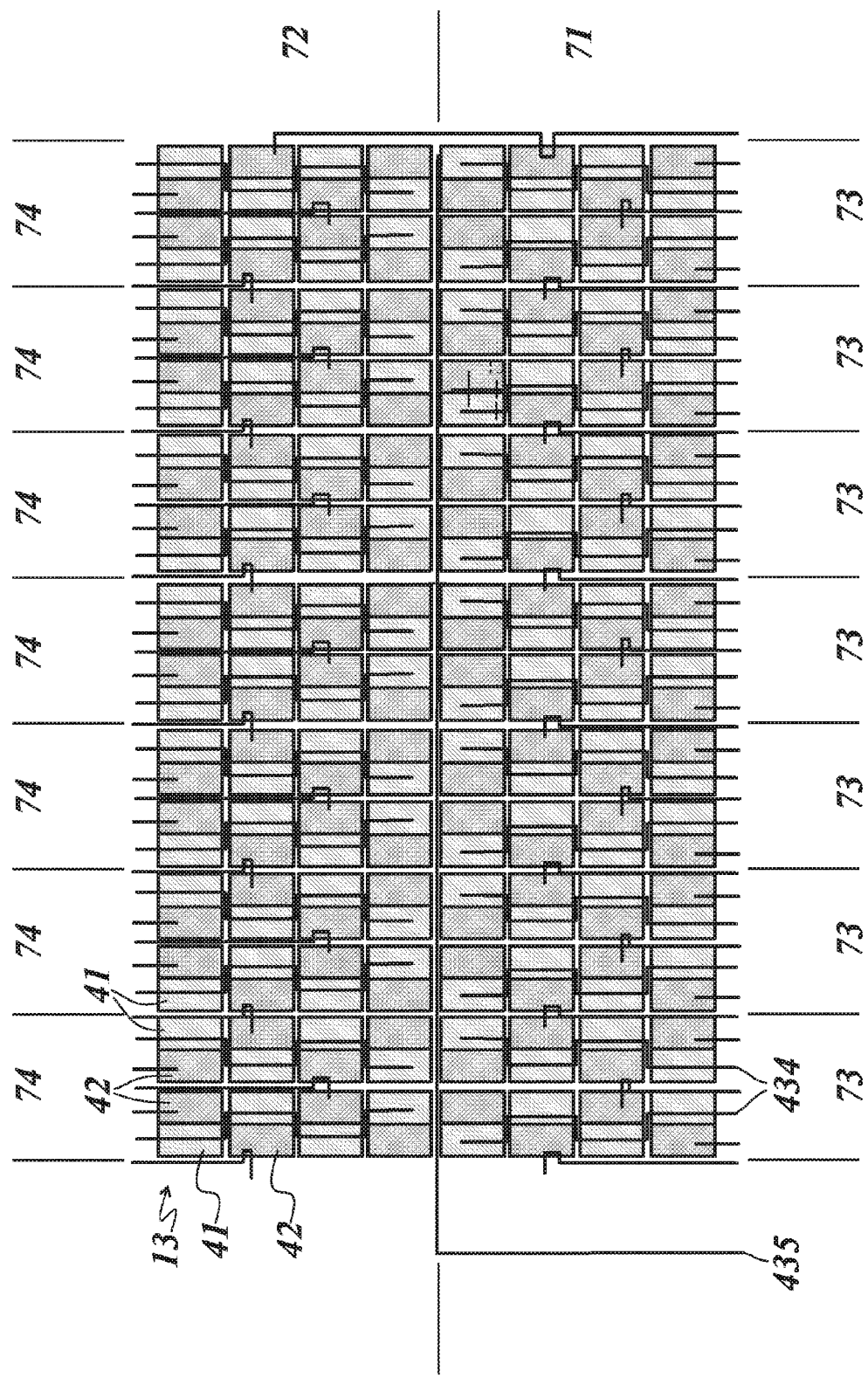
Figure 12C:
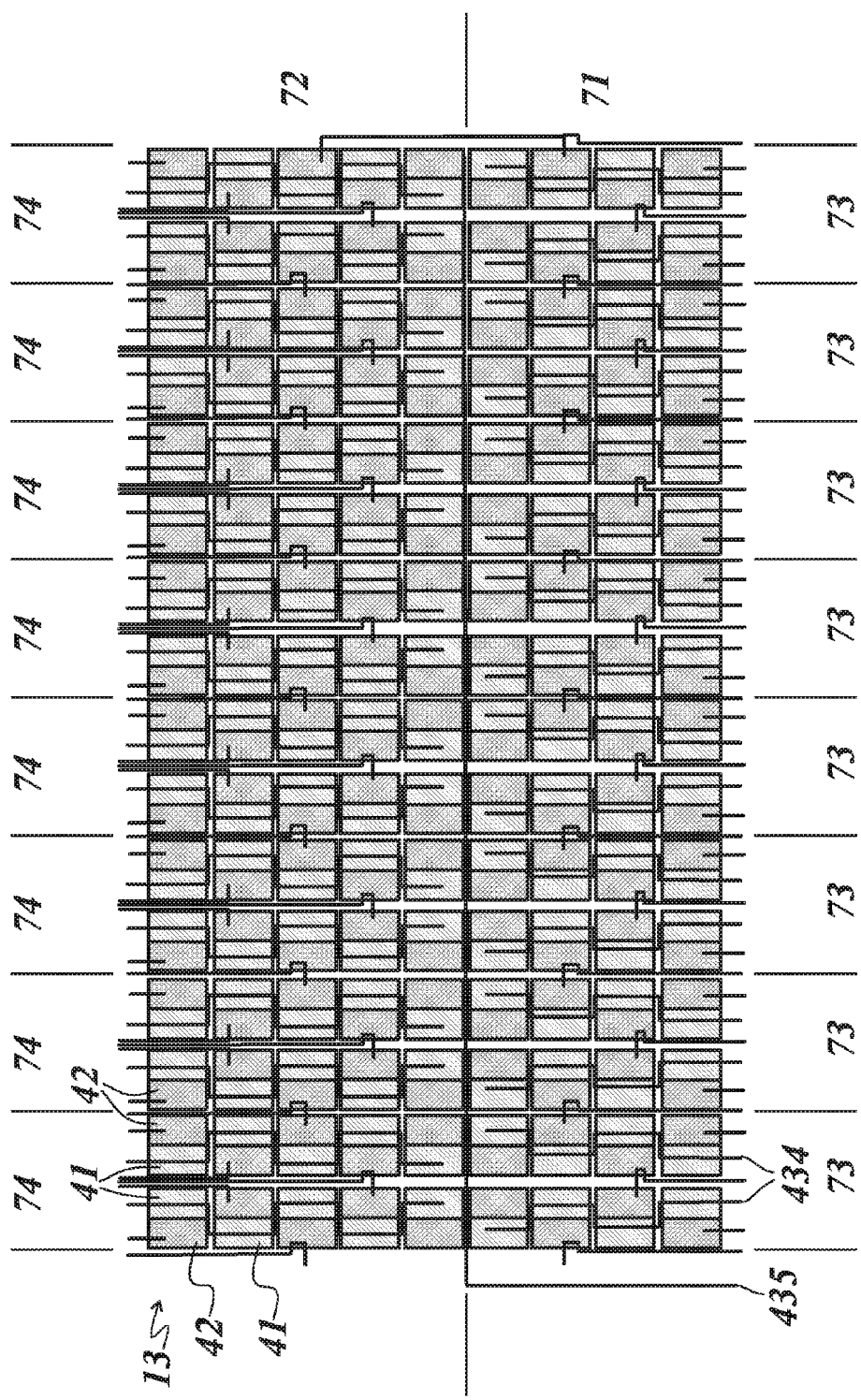

FIG. 12a to FIG. 12b show a matrix with 6×8, 8×14 and 1×16 touch panels 13. These matrices are constructed according to the operating principle which has already been explained with the help of Figures FIG. 7b to FIG. 10b.

The matrices thus have two subareas 71 and 72. Each of the subareas 71 and 72 is further composed of an iterative arrangement of subareas 73 and 74, respectively, which each have an analogous construction. The subareas 73 and 74 can thus be arranged in any number in the subareas 71 and 72, with the result that, according to the construction principles illustrated with the help of Figures FIG. 12a to FIG. 12c, matrices with any number of columns can be realized, depending on the number of the subareas 73 and 74 which are contained in the subareas 71 and 72.

The invention claimed is:
1. In a capacitively operating touch panel device, a multilayer body comprising:
a body having a first transparent area;
the body including a carrier substrate transparent in at least the first area;

a plurality of touch panels in the first area on the carrier substrate;

the touch panels comprising a partially electrically conductive first layer on the substrate that is transparent at least in the first area and which first layer, in the first area, has electrically conductive transmission areas, electrically conductive receiving areas and electrically conductive connection areas, which are each formed by a pattern of electrically conductive, non-transparent tracks, wherein the conductive tracks comprise one material and are applied with a material thickness with which the first electrically conductive layer appears non-transparent;

wherein the width of the tracks in the first area is such that the electrically conductive transmission areas, receiving areas and connection areas are transparent in the first area;

wherein, in the area of each touch panel in the first layer, one of the electrically conductive transmission areas and one of the electrically conductive receiving areas are galvanically separated from each other on either side of a gap which separates them;

wherein n transmission areas of different touch panels in the first layer are electrically connected to each other and to a contact area formed outside the first area in the first layer via one of the electrically conductive connection areas, and m receiving areas of different touch panels in the first layer are electrically connected to each other and to a contact area formed outside the first area via one of the electrically conductive connection areas formed in the first layer;

wherein n≥2 and m≥2, wherein the touch panels form a 2-dimensional matrix with two or more columns and with two or more rows, wherein, in a first group of touch panels, the transmission area is located to the left of the receiving area in a given plan view and, in a second group of touch panels, the transmission area is located to the right of the receiving area in that given plan view;

wherein touch panels of the first group and of the second group alternate next to each other in each of the rows of the matrix, such that two transmission areas or two receiving areas are opposite each other in each case at the boundary between two touch panels of the same row; and wherein touch panels of the first and second groups alternate next to each other in a first subarea of the matrix, both in the direction of the rows and in the direction of the columns, such that two transmission areas and two receiving areas are alternately opposite each other at the boundary between two touch panels of the same row, wherein the matrix has two or more rows and two or more columns in the first subarea.

2. Multi-layer body according to claim 1 wherein touch panels of the same group of touch panels in each column.

3. Multi-layer body according to claim 1 wherein a transmission group of four transmission areas adjacent to each other are connected to each other and to assigned contact areas via one of the connection areas and/or a receiving group of four receiving areas adjacent to each other are connected to each other and to the assigned contact area via one of the connection areas.

4. Multi-layer body according to claim 1 wherein two or more transmission groups and two or more receiving groups are offset from each other in a checkered pattern, such that, relative to each other, four receiving groups are adjacent to at least one transmission group or four transmission groups are adjacent to at least one receiving group.

5. Multi-layer body according to claim 1 wherein the connection areas comprise strip conductor sections which run from inside to outside in relation to the first area and which run in the boundary area between two columns or two rows of the matrix, wherein four or more such strip conductor sections run in a stellate manner towards all sides from inside to outside.

6. Multi-layer body according to claim 1 wherein a respective connection area connects two or more transmission or receiving areas adjacent to each other to form an area which is electrically conductive over the whole surface of the corresponding layer and which is one of a rectangular, square or octagonal shape.

7. Multi-layer body according to claim 1 wherein the first area has a longitudinal axis, wherein the rows of the matrix and the longitudinal axis of the first area have an angular offset to each other at an angle of 45°.

8. Multi-layer body according to claim 1 wherein two or more transmission areas adjacent to each other are grouped into a transmission group or two or more receiving areas adjacent to each other are grouped into a receiving group, and in that one or more of the connection areas have strip conductor sections which run from inside to outside in relation to the first area and which each divide one or more of the transmission groups or receiving groups.

9. Multi-layer body according to claim 8 wherein certain of the strip conductor sections divide a transmission or receiving group and widen in the area in which they divide the transmission or receiving group.

10. Multi-layer body according to claim 1 wherein in the first subarea, in each case all receiving areas of every column or all transmission areas of every column are electrically connected to each other via a respective connection area.

11. Multi-layer body according to claim 1 wherein in case a), all transmission areas of an uppermost row and, in case b), all receiving areas of an uppermost row are electrically connected to each other via a respective connection area.

12. Multi-layer body according to claim 1 wherein one or more of the connection areas in the first subarea have strip conductor sections which run in the direction of the columns of the matrix from inside to outside in relation to the first area and which are in a boundary area between two columns of the matrix.

13. Multi-layer body according to claim 1 wherein the matrix has a second subarea, which is arranged above the first subarea of the matrix, and in that, in the second subarea of the matrix, touch panels of the first group and of the second group are next to each other alternating in the rows and in the columns.

14. Multi-layer body according to claim 13 wherein the second subarea has a mirror-image symmetrical arrangement, with respect to the boundary line between first and second subareas, of transmission areas and receiving areas and/or connection areas in relation to the first subarea.

15. Multi-layer body according to claim 1 wherein the matrix has at least one third subarea, which has the same arrangement of transmission areas and receiving areas and/or connection areas as the first subarea or the second subarea, and in that the third subareas are next to the first subarea or next to the second subarea, respectively.

16. Multi-layer body according to claim 1 wherein the matrix has between four and ten rows and four or more columns.

17. Multi-layer body according to claim 1 wherein, in a second area which surrounds the first area, an electrically conductive second layer is provided, via which two or more of the connection areas of the first layer are electrically coupled to each other.

18. Multi-layer body according to claim 1 wherein the contact areas of the first layer are connected to an electrical contact connector via the second layer and/or via strip conductors formed in the first layer, or form an electrical contact connector or parts of an electrical contact connector.

19. Multi-layer body according to claim 1 wherein every touch panel has a width and/or length between 4 mm and 40 mm.

20. Multi-layer body according to claim 1 wherein every transmission area and/or receiving area has a width and/or length between 2 mm and 20 mm.

21. Multi-layer body according to claim 1 wherein the width of the conductive, non-transparent tracks in the transmission areas, receiving areas and/or connection areas is such that these areas each have an average surface conductivity of between 0.1 ohm/square and 10 ohm/square.

22. Multi-layer body according to claim 1 wherein the separating gap between transmission areas and receiving areas has a width between 5 µm and 1000 µm.

23. Multi-layer body according to claim 1 wherein there is a gap between a transmission area and a receiving area that meanders in each touch panel.

24. Multi-layer body according to claim 23 wherein several or all touch panels are each triangular and have in each case a meandering gap between a transmission area and a receiving area.

25. Multi-layer body according to claim 23 wherein the gap between touch panels inside the connector strip conductors which are led out and the respectively adjoining transmission areas and/or receiving areas is narrower than the respective separating gap between the transmission areas and receiving areas by at least 20%.

26. Multi-layer body according to claim 1 wherein selective conductors of the connecting strip conductors are led out of the respective panels, and wherein there is a respective separating gap between the transmission areas and the receiving areas, the respective separating gap between the transmission areas and the receiving areas has a different width from a gap between touch panels within the connecting strip conductors which are led out and the respectively adjoining transmission and/or receiving areas.

* * * * *